(12) United States Patent
Bateman et al.

(10) Patent No.: US 9,745,515 B2
(45) Date of Patent: Aug. 29, 2017

(54) FIRE RESISTANT MATERIAL

(75) Inventors: Stuart Arthur Bateman, Victoria (AU); Matthew Jon Partlett, New South Wales (AU); Dong Yang Wu, Victoria (AU)

(73) Assignees: Commonwealth Scientific And Industrial Research Organisation, Campbell (AU); The Boeing Company, Seattle, WA (US)

( * ) Notice: Subject to any disclaimer, the term of this patent is extended or adjusted under 35 U.S.C. 154(b) by 105 days.

(21) Appl. No.: 13/089,658

(22) Filed: Apr. 19, 2011

(65) Prior Publication Data

US 2011/0281981 A1 Nov. 17, 2011

(30) Foreign Application Priority Data

Oct. 31, 2002 (AU) ................................. 2002952373

(51) Int. Cl.
| | | |
|---|---|---|
| *C08K 5/3492* | (2006.01) | |
| *C09K 21/10* | (2006.01) | |
| *C09K 21/06* | (2006.01) | |
| *C01B 33/44* | (2006.01) | |

(52) U.S. Cl.
CPC .............. *C09K 21/06* (2013.01); *C01B 33/44* (2013.01)

(58) Field of Classification Search
CPC ................................. C01B 33/44; C09K 21/06
USPC .......................................... 524/101; 252/609
See application file for complete search history.

(56) References Cited

U.S. PATENT DOCUMENTS

| | | | |
|---|---|---|---|
| 4,341,694 A * | 7/1982 | Halpern ........................ | 252/606 |
| 4,511,684 A | 4/1985 | Schmid et al. | |
| 4,739,007 A | 4/1988 | Okada et al. | |
| 4,889,885 A * | 12/1989 | Usuki et al. ................... | 524/445 |
| 5,708,065 A * | 1/1998 | Martens et al. ............... | 524/100 |
| 5,753,003 A * | 5/1998 | Sugawa ..................... | B09C 1/10 |
| | | | 435/262 |
| 5,770,644 A | 6/1998 | Yamamoto et al. | |
| 5,773,502 A | 6/1998 | Takekoshi et al. | |
| 6,294,599 B1 | 9/2001 | Inoue et al. | |
| 6,323,272 B1 | 11/2001 | Tamura et al. | |
| 6,355,717 B1 | 3/2002 | Tamura et al. | |
| 2003/0209699 A1* | 11/2003 | Chyall et al. ................. | 252/606 |
| 2007/0194289 A1 | 8/2007 | Bateman | |

FOREIGN PATENT DOCUMENTS

| | | | |
|---|---|---|---|
| EP | 1 076 077 A | 2/2001 | |
| EP | 1 090 954 A | 4/2001 | |
| EP | 1 022 314 A | 7/2006 | |

(Continued)

OTHER PUBLICATIONS

Espacenet English abstract of JP 8-319418 A.

(Continued)

*Primary Examiner* — Shuangyi Abu Ali
(74) *Attorney, Agent, or Firm* — Ladas & Parry, LLP

(57) ABSTRACT

The present invention relates to inorganic-organic hybrids (IOHs), methods for their preparation and their use as fire resistant materials or components of fire resistant materials. More specifically, the invention relates to polyamide fire resistant formulations containing IOHs which have application in the production of fire resistant articles or parts thereof for use in the transportation, building, construction and electrical or optical industries.

61 Claims, 6 Drawing Sheets

(56) References Cited

FOREIGN PATENT DOCUMENTS

| | | |
|---|---|---|
| GB | 1 114 174 | 5/1968 |
| JP | 4-357107 A | 12/1992 |
| JP | 7-242817 A | 9/1995 |
| JP | 8-319418 A | 12/1996 |
| JP | 9-227119 A | 9/1997 |
| JP | 10-81510 A | 3/1998 |
| JP | 10-182141 | 7/1998 |
| JP | 00/44669 A1 | 8/2000 |
| JP | 2001-49117 A | 2/2001 |
| JP | 2001-118428 A | 4/2001 |
| WO | 93/04117 | 3/1993 |
| WO | 93/04118 | 3/1993 |
| WO | 98/36022 | 8/1998 |
| WO | 99/41299 A1 | 8/1999 |
| WO | 99/43747 | 9/1999 |
| WO | 00/66657 | 11/2000 |
| WO | 02/16479 A1 | 2/2002 |
| WO | 02/48248 A2 | 6/2002 |

OTHER PUBLICATIONS

Espacenet English abstract of JP 10-81510 A.
Patent Abstracts of Japan English translation of JP 7-242817 A.
Patent Abstracts of Japan English of JP 9-227119 A.
Patent Abstracts of Japan English abstract of JP 4-357107 A.
Patent Abstracts of Japan English translation of JP 2001-118428 A.
Espacenet English abstract of JP 2001-49117 A.
Derwent Abstract Accession No. 97-073190107, Class A23, A85, A95, JP 08319418 A (Dec. 3, 1996).
Derwent Abstract Accession No. 2002-599501/64, Class A18, E19, G 02, J04, A21, A97, WO 2002/48248 A2 (Jun. 20, 2002).
Derwent Abstract Accession No. 2002-443836/47, Class A96,A14,A17 WO 2002/16479 A1 (Feb. 28, 2002).
Bourbigot, S., et al., PA6 Clay Nanocomposite Hybrid as Char Forming Agent in Intumescent Formulations, *Fire and Materials*, 24, pp. 201-208 (2000).
Gilman, J., "Flammability and Thermal stability studies of polymer layered-silicate (clay) nanconposite", Applied Clay Science 15 pp. 31-49 (1999).
Gilman, J., et al., "Flammability Studies of Polymer Layered Silicate Nanocomposites", 43rd International SAMPE Symposium (May 31-Jun. 4, 1998).
Douglas Hunter, Cyanate ester clay nanocornposites: synthesis and flammability studies; 1999; Evolving and revolutionary technologies for the new Millennium. International SAMPE Symposium/Exhibition 44 th, Society for the advancement of material and processing Engineering (SAMPE). May 23-27, 1999.
PCT Search Report from PCT/AU2003/001443 mailed on Dec. 5, 2003.
PCT International Preliminary Examination Report from PCT/AU2003/001443 dated Feb. 22, 2005.
Office Action from U.S. Appl. No. 10/533,579 dated Dec. 4, 2009.
Office Action from U.S. Appl. No. 10/533,579 dated May 11, 2010.
Office Action from U.S. Appl. No. 10/533,579 dated Nov. 30, 2010.
Office Action from U.S. Appl. No. 10/533,579 dated Apr. 23, 2014.
Neunano product sheet for Cloisite 15A, available at http://www.neunano.com/index.php?option=com_content&view=article&id=70&Itemid=81, printed Jul. 1, 2015 ( 1 page).
Neunano product sheet for Cloisite® 30B, available at http://www.neunano.com/index.php?option=com_content&view=article&id=72&Itemid=83, printed Jul. 25, 2015 (1 page).
Jones, T.R., "The Properties and Uses of Clays Which Swell in Organic Solvents", Clay Minerals (1983) 18, 399-410.
Tolleson, W.H. et al., "Background Paper on the Chemistry of Melamine Alone and in Combination with Related Compounds," Health Canada, Ottawa, Dec. 2008 (18 pages).
Giannelis, Emmanuel P., "Polymer Layered Silicate Nanocomposites,"Advance Materials, 1996, vol. 8, No. 1, pp. 29-35.
Hunter, Douglas, "Cyanate ester clay nanocomposites: synthesis and flammability studies," Evolving and Revolutionary Technologies for the New Millennium, International SAMPE Symposium/Exhibition, 44th, Society for the Advancement of Material and Processing Engineering (SAMPE), May 23-27, 1999, 16 pages.
Nguyen, Quang T. and Baird, Donald G., "Preparation of Polymer-Clay Nanocomposites and Their Properties," Advances in Polymer Technology, vol. 25, No. 4, pp. 270-285, 2006.

* cited by examiner

FIRE RESISTANT MATERIAL

This is a divisional of copending application number application Ser. No. 10/533,579 filed on Feb. 6, 2007 which is a 371 of International Application AU2003/001443 filed on Oct. 31, 2003, which designated the U.S., claims the benefit thereof and incorporates the same by reference.

The present invention relates to inorganic-organic hybrids (IOHs), methods for their preparation and their use as fire resistant materials or components of fire resistant materials. More specifically, the invention relates to polyamide fire resistant formulations containing IOHs which have application in the production of fire resistant articles or parts thereof for use in the transportation, building, construction and electrical or optical industries.

BACKGROUND OF THE INVENTION

Materials based on organic polymeric systems (plastics) are widely used in the transportation, building and construction industries. A drawback of many types of organic polymers is flammability which limits their suitability in applications requiring flammability resistance and where regulatory authorities govern flammability standards.

In commercially produced polymeric systems, flame-retarding species may be added during processing or forming of the materials to reduce the end products flammability. Conventional flame-retardants may be divided into different categories including:

Halogen based: which consist of either brominated or chlorinated chemicals such as brominated polystyrene or phenylene oxide (Dead Sea Bromine or Great Lakes CC) or bis(hexachlorocyclopentadieno) cyclooctane (Occidental CC).

Phosphorus based: which consist of a range of different chemistries from elemental phosphorus (Clarient), phosphonates (A&W antiblaze 1045), phosphonate esters (Akzo Nobel), phosphites, phosphates and polyphosphates including melamine phosphite and phosphate, ammonium and melamine polyphosphate (DSM Melapur).

Nitrogen based: such as melamine and its salts (U.S. Pat. No. 4,511,684 Schmidt & Hoppe).

Intumescent agents: incorporating (i) an acid source (carbonization catalyst) such as ammonium polyphosphate; (ii) a carbonization reagent e.g. polyhydric alcohols such as pentaerythritol; and (iii) a blowing reagent like melamine. Expandable graphite is also known to undergo thermal expansion on addition of heat.

Inorganic additives: such as magnesium hydroxide and aluminum hydroxide (Martinswerk), zinc borate (Fire Brake ZB, US Borax) and antimony trioxide.

Although the addition of fire retardants to polymeric systems may improve their fire performance other important properties are often adversely effected for example:
Mechanical performance
Surface finish
Durability
Rheology
Stability
Smoke generation
Toxicity
Cost
Recyclability Furthermore, there has been considerable recent impetus to reduce the use of some flame-retardant classes due to toxicological or environmental concerns. Such legislation has placed pressure on the use of halogenated compounds and certain metal oxide synergists. Phosphorus-based flame-retardants such as phosphonates and elemental (red) phosphorus are also undesirable due to their regulation under chemical weapon acts and considerable manufacturing danger.

As far back as 1965, Jonas (GB 1114,174) teaches that the incorporation of organically modified clay into plastics reduces melt dripping during combustion.

More recently it has been shown that under certain synthetic or processing conditions, organically modified clay may be nano-dispersed into polymeric materials to improve mechanical and fire performance.

Okada et al, (U.S. Pat. No. 4,739,007 (1988) Toyota) teaches that nylon 6 materials with improved mechanical and heat distortion temperature can be prepared by adding suitably modified clay during the synthesis of nylon 6. In this case the growing nylon chains force apart the clay platelets to form intercalated or exfoliated nanomaterial structures (so called in 'situ polymerisation' method).

A more commercially desirable method of nano-dispersing modified clay is described by Maxfield, et al, (WO 93/04118 WO 93/04117 (1993) Allied Signal). Maxfield teaches that clay-plastic nanomaterials with improved mechanical and heat distortion performance may be prepared by subjecting functionalised clay and molten plastics such as nylon6, nylon66 and PBT to shear forces.

Others have investigated the fire performance of plastics incorporating clay nano particles. Gilman has studied the fire performance of nylon-nanomaterials prepared through the 'in situ' polymerisation pathway using cone calorimetry (Proc. 43. Int. SAMPE Sympos., (1998), p 1053-1066, Fire and Materials, 24, (2000), p 201-208, Applied Clay Science, 15, (1999), p 31-49). Improved heat release rates were achieved with the addition of commercially modified clay, without increasing toxic gas or smoke generation. Gilman teaches that the improved fire performance results from the nanoparticles both mechanically stabilizing the char and enhancing its harrier properties. Although Gilman's cone calorimetry tests suggest improved performance in terms of a reduction in heat release rate, no mention was made of other aspects of the materials fire performance in common tests described by bodies such as ASTM and FAA which are used to assess, regulate and qualify the fire worthiness of materials.

Other groups have reported that traditional flame-retardants and nano-dispersed clays can act synergistically to improve fire performance.

Klatt (WO 98/36022, (1998) BASF) teaches that nylon materials incorporating organically modified clay and red phosphorus synergistically improve fire performance to produce a VO rating in UL94 type vertical burn tests. However, such compositions are undesirable due to the danger associated with handling of elemental phosphorus.

Morton (WO 99/43747, (1999) General Electric Company) teaches that in certain polyester blends, phosphorus based flame retardants especially resorcinol diphosphate and organically modified clay act synergistically to improve fire performance. No mention, however, is made of other important aspect such as the effect on mechanical performance, smoke and toxic gas emission.

Takekoshim (U.S. Pat. No. 5,773,502 (1998) General Electric Company) teaches that conventional halogenated-$Sb_2O_3$ flame-retardant systems and organically modified clay can act synergistically. Takekoshim claims that nano-dispersed clay allows for reductions in the amount of $Sb_2O_3$ and halogenated flame retardant required to maintain a VO rating in the UL 94 flammability test. Clearly any use of halogenated flame retardant is undesirable.

Masaru, T (JP 10182141 (1998) Sumitoma, Chem. Co.) disclose a fire resistant and thermally expandable material at temperatures between 100 to 150° C. whereby blowing reagents such as those containing azo, diazo, azide or triazine compound are located between the layers of the silicate. In many polymeric systems, however, this flame retarding system is undesirable since they require moulding or forming at temperatures between 100° C. to 150° C.

Inoue and Hosokawa (JP 10081510 (1998) Showa Denko K.K.) investigated the use of fluorinated synthetic mica exchanged with melamine (0.1-40%) and melamine salts (<10%) as a means of flame proofing plastics in a two step extrusion process. They claim that a VO rated Nylon6 (UL94 vertical burn test) was achieved at a loading of 5 percent-modified mica when greater than 80% exfoliation occurred. The use of synthetic clays and multiple step processing is clearly undesirable from a commercial viewpoint. Inoue and Hosokawa do not disclose highly desirable chemistries and methodologies associated with triazine based formulations which effect mechanical and fire performance. Furthermore, they do not disclose important methodologies to flame retarded thin parts known by those in the art to be extremely difficult to render flame resistant whilst simultaneously reducing toxic gas and smoke generation during combustion.

In a later disclosure Inoue, H., and co-workers (U.S. Pat. No. 6,294,599 (2001) Showa Denko K.K.) also teach that polyamides reinforced with fibrous additives may be rendered flame resistant through the addition of triazine-modified clay and additional flame retardant. They describe a highly rigid flame-retardant polyamide comprising a polyamide, silicate-triazine compound reinforcement and flame retardant/adjunct. The poor rheological properties of highly rigid polyamide formulations limit the inventions usefulness in preparing components made by conventional processing techniques such as rotational or blow moulding, that are complex or thin walled or which require high ductility or impact performance.

Brown, S. C. et al (WO 00/66657, Alcan International) disclose a polymeric material incorporating Cloisite montmorillonite in combination with $Al(OH)_3$ for the production of fire resistant cables. This strategy is clearly only suitable for plastics that are processed at low temperatures considering that $Al(OH)_3$ decomposes to release water vapor at temperatures above approximately 190° C.

Accordingly, there is a need for the development of new flame retarding systems which both meet the performance criteria associated with specific applications and address the above concerns.

SUMMARY OF THE INVENTION

According to one aspect of the present invention there is provided an inorganic-organic hybrid (IOH) which comprises:
(i) an expandable or swellable layered inorganic component; and
(ii) an organic component including at least one ionic organic component.

Preferably, the organic component of the IOH also includes one or more neutral organic components which are intercalated between and/or associated with the layer(s) of the inorganic component.

According to another aspect of the present invention there is provided a method for the preparation of the IOH defined above which comprises mixing components (i) and (ii) defined above or constituents thereof in one or more steps.

The present invention also provides the use of the IOH defined above as a fire resistant material.

According to a further aspect of the present invention there is provided a fire resistant formulation which comprises:
(i) the IOH defined above; and
(ii) one or more flame retardants.

According to a still further aspect of the present invention there is provided a method for the preparation of the fire resistant formulation defined above which comprises mixing components (i) and (ii) as defined above or constituents thereof in one or more steps.

The present invention also provides a polyamide fire resistant formulation which comprises either:
(A) (i) the IOH defined above; and
    (ii) a polyamide based matrix; or
(B) (i) the fire resistant formulation defined above; and
    (ii) a polyamide based matrix.

The present invention further provides a method for the preparation of the polyamide fire resistant formulation defined above which comprises dispersing the IOH or the fire resistant formulation defined above or constituents thereof into the polyamide based matrix in one or more steps.

The IOH and/or fire resistant formulations of the present invention may be used to produce fire resistant articles or parts thereof.

Thus, the present invention provides a fire resistant article or parts thereof which is composed wholly or partly of the IOH and/or fire resistant formulations defined above.

The present invention also provides a method of preparing the fire resistant article or parts thereof defined above which comprises moulding or forming the IOH and/or fire resistant formulations defined above.

DETAILED DESCRIPTION OF THE INVENTION

For the purposes of this specification it will be clearly understood that the word "comprising" means "including but not limited to", and that the word "comprises" has a corresponding meaning. It should also be noted that for the purposes of this specification the terms "swellable" and "expandable" relating to the layered inorganic component are interchangeable.

The inorganic component is a swellable/expandable layered inorganic based material, rendered positively (or negatively) charged due to isomorphic substitution of elements within the layers, such as, those based on a 1:1 layered silicate structure such as kaolin, and serpentine and a 2:1 layered silicate structure such as phyllosilicates, talc and pyrophyllite. Other useful layered minerals include layered double hydroxides of the general formula $Mg_6Al_{3.4}(OH)_{18.8}(CO_3)_{1.7}.H_2O$ including hydrotalcites and synthetically prepared layered materials including synthetic hectorite, montmorillonite, fluorinated synthetic mica and synthetic hydrotalcite.

The group consisting of naturally occurring or synthetic analogues of phyllosilicates is particularly preferred. This group includes smectite clays such as montmorillonite, nontronite, beidellite, volkonskoite, hectorite, bentonite, saponite, sauconite, magadiite, kenyaite, laponite, vermiculite, synthetic micromica (Somasif) and synthetic hectorite (Lucentite). Other useful layered minerals include illite minerals such as ledikite and mixtures of illite minerals with said clay minerals.

Naturally occurring phyllosilicates such as bentonite, montmorillonite, and hectorite are most preferred. Such phyllosilicates with platelet thicknesses less than about 5 nanometers and aspect ratios greater than about 10:1, more preferably greater than about 50:1 and most preferably greater than about 100:1 are particularly useful.

The preferred inorganic materials generally include interlayer or exchangeable metal cations to balance the charge, such as, alkali metals or alkali earth metals, for example, $Na^+$, $K^+$, $Mg^{2+}$ or $Ca^{2+}$, preferably $Na^+$. The cation exchange capacity of the inorganic material should preferably be less than about 400 milli-equivalents per 100 grams, most preferably about 50 to about 200 milli-equivalents per 100 grams.

The organic component includes one or more ionic species that may be exchanged with the exchangeable metal ions associated with the inorganic component and optionally one or more neutral organic species which are intercalated between and/or associated with the layer(s) of the inorganic component and/or one or more coupling reagents.

The term "associated with" is used herein in its broadest sense and refers to the neutral organic component being attached to the layer(s) of the inorganic component, for example, by secondary bonding interactions, such as, Van der Waals interactions or hydrogen bonding or trapped by steric limitation.

Suitable examples of ionic species include those that contain onium ions such as ammonium (primary, secondary, tertiary and quaternary), phosphonium or sulfonium derivatives of aliphatic, aromatic or aryl-aliphatic amines, phosphines and sulfides.

Such compounds may be prepared by any method known to those skilled in the art. For example, salts prepared by acid-base type reactions with mineral or organic acids including hydrochloric, sulfuric, nitric, phosphoric, acetic and formic acids, by Lewis-acid Lewis-base type reactions or by reaction with alkyl halides to form quaternary salts for example using Menschutkin type methodology.

Ionic or neutral compounds which are known to decompose or sublime endothermically, and/or which release volatiles with low combustibility on decomposition and/or induce charring of organic species during thermal decomposition or combustion are particularly preferred.

Suitable species include neutral or ionic derivatives of nitrogen based, molecules, such as, triazine based species, for example, melamine, triphenyl melamine, melam (1,3,5-triazine-2,4,6-triamine-n-(4,6-diamino-1,3,5-triazine-yl)), melem ((-2,5,8-triamino-1,3,4,6,7,9,9b-heptaazaphenalene)), melon (poly{8-amino-1,3,4,6,7,9,9b-heptaazaphenalene-2,5-diyl)imino}), bis and triaziridinyltriazine, trimethylsilyltriazine, melamine cyanurate, melamine phthalate, melamine phosphate, melamine phosphite, melamine phthalimide, dimelamine phosphate, phosphazines and/or low molecular weight polymers with triazine and phosphazine repeat units or salts or derivatives of the above molecules including onium ion derivatives or salts or derivatives of isocyanuric acid, such as, isocyanuric acid, cyanuric acid, triethyl cyanurate, melamine cyanurate, trigylcidylcyanurate, triallyl isocyanurate, trichloroisocyanuric acid, 1,3,5-tris(2-hydroxyethyl)triazine-2,4,6-trione, hexamethylenentetramine. melam cyanurate, melem cyanurate and melon cyanurate.

Reagents known to induce charring of organic species include derivatives of phosphoric acid or boric acid, such as ammonia polyphosphate and melamine polyphosphate, melamine phosphate ammonium borate.

In another embodiment of the invention, the preferred ionic compounds may be optionally used in combination with other ionic compounds, for example, those known to improve compatibility and dispersion between the layered inorganic material and polymeric matrices such as those described in WO 93/04118 for the preparation of nanomaterials. Amphiphilic molecules that incorporate a hydrophilic ionic group along with hydrophobic alkyl or aromatic moieties are preferred.

One or more coupling reagents may also be associated with the inorganic component. Suitable coupling reagents include organically functionalised silanes, zirconates and titanates. Examples of silane coupling reagents include tri-alkoxy, acetoxy and halosilanes functionalised with amino, epoxy, isocyanate, hydroxyl, thiol, mercapto and/or methacryl reactive moieties or modified to incorporate functional groups based on triazine derivatives, long chain alkyl, aromatic or alkylaromatic moieties. Examples of zirconate and titanate coupling reagents include Teaz and Titan1.

It is known in the art that metal cations or anions associated with layered inorganic materials may be exchanged with organic ions through ion exchange processes. In a typical process, the layered inorganic material is first swollen or expanded in a suitable solvent(s) prior to ion exchange and then collected from the swelling solvent following agglomeration using methods such as filtration, centrifugation, evaporation or sublimation of the solvent. Ion exchange techniques with suitable molecules are known to be a useful method of increasing the compatibility between clay and organic polymeric binders, thus aiding dispersion of clay platelets into polymeric based matrices on a nanometer scale.

We have discovered that the ion exchange process may be optionally carried out in the presence of one or more types of organic ion to produce an inorganic-organic hybrid with a plurality of functions. Without wishing to limit the present invention, such functions may include the presence of ions which promote dispersion, compatibility and interactions with the plastic matrix and ions useful to improve other properties such as fire performance. Generally during ion exchange the organic ions are added in molar excess of the ion exchange capacity of the inorganic material, preferably less than about 10-fold excess, more preferably less than about a 5-fold excess is required.

It has also been unexpectedly discovered that the ion exchange processes may be carried out in the presence of functional dissolved or partially dissolved neutral species. Without being limited by theory, it is proposed that at least a portion of the neutral species are trapped in the intergallery region or otherwise associated with the layered inorganic material following ion exchange. Such a process provides a useful mechanism of dispersing neutral additives on a molecular level into plastics. Again without being limited by theory, during melt processing at least partial exfoliation of the inorganic-organic hybrid allows the neutral molecules to diffuse away and become homogeneously dispersed with the matrix on a molecular level. This has a major impact on the performance of the resultant material since it is well known that efficient dispersion of all components in a plastic formulation, preferably on a nano- or molecular scale, is an important factor for achieving optimum performance.

In another aspect of the invention, the IOH may be treated prior, during or following ion exchange with one or more coupling reagents as described above. The coupling reagents are derivatized to improve, for example, the compatibility and interactions between the inorganic phase and polymeric matrix or to attach other desirable functionalities to the inorganic layered phase.

Suitable flame retardants which retard flame propagation, heat release and/or smoke generation which may be added singularly or optionally synergistically to the IOH include:

Phosphorus derivatives such as molecules containing phosphate, polyphosphate, phosphites, phosphazine and phosphine functional groups, for example, melamine phosphate, dimelamine phosphate, melamine polyphosphate, ammonia phosphate, ammonia polyphosphate, pentaerythritol phosphate, melamine phosphite and triphenyl phosphine.

Nitrogen containing derivatives such as melamine, melamine cyanurate, melamine phthalate, melamine phthalimide, melam, melem, melon, melam cyanurate, melem cyanurate, melon cyanurate, hexamethylene tetraamine, imidazole, adenine, guanine, cytosine and thymine.

Molecules containing borate functional groups such as ammonia borate and zinc borate.

Molecules containing two or more alcohol groups such as pentaerythritol, polyethylene alcohol, polyalycols and carbohydrates, for example, glucose, sucrose and starch.

Molecules which endothermically release non-combustible decomposition gases, such as, metal hydroxides, for example, magnesium hydroxide and aluminum hydroxide.

Expandable Graphite

The polyamide based matrix may be included in the fire resistant formulation in pellet, granule, flake or powdered form. Suitable polyamides comprise generic groups with repeat units based on amides, such as, Nylon4, Nylon6, Nylon7, Nylon 11 and Nylon12, Nylon46, Nylon66, Nylon 68, Nylon610, Nylon612 and aromatic polyamides, for example, poly'm'phenyleneisophthalamine and poly'p'phenylene'terephthalmamide.

It will be appreciated that the polyamide based matrix may include co-polymers, blends and alloys. The co-polymers may be made up of two or more different repeat units one of which is an amide. Such co-polymers may be prepared by any suitable methods known in the art, for example, at the point of initial polymerisation or later through grafting or chain extension type reactions during processing. The polyamide blends and alloys may be prepared using any method known to those skilled in the art including melt or solution blending. Blending or alloying the polyamide with other polymers may be desirable to improve properties such as toughness, modulus, strength, creep, durability, thermal resistance, conductivity or fire performance.

Nylon12, Nylon6 and Nylon66 and their respective co-polymers, alloys and blends are particularly preferred.

The polyamide formulation can also optionally contain one or more additives known in the art of polymer processing, such as, polymeric stabilisers, for example, UV, light and thermal stabilisers; lubricants; antioxidants; pigments, dyes or other additives to alter the materials optical properties or colour; conductive fillers or fibers; release agents; slip agents; plasticisers; antibacterial or fungal agents, and processing agents, for example, dispersing reagents, foaming or blowing agents, surfactants, waxes, coupling reagents, rheology modifiers, film forming reagents and free radical generating reagents.

A particularly preferred formulation comprises Nylon12, Nylon6 and/or Nylon66; montmorillonite modified with melamine hydrochloride and/or melamine; melamine cyanurate and/or melam (1,3,5-triazine-2,4,6-triamine-n-(4,6-diamino-1,3,5-triazine-yl)) cyanurate, and/or melem ((-2,5,8-triamino-1,3,4,6,7,9,9b-heptaazaphenalene)) cyanurate and/or melon (poly{8-amino-1,3,4,6,7,9,9b-heptaazaphenalene-2,5-diyl)imino}) cyanurate; magnesium hydroxide; and one or more additives.

The polyamide formulation preferably contains a polyamide based matrix in an amount of from about 50 to about 95% w/w, an IOH in an amount less than about 25% w/w and optionally a flame retardant and/or additives in an amount less than about 30% w/w, but in some cases preferably above about 10% w/w.

It has been discovered that the IOH may be readily dispersed into the polyamide based matrix during the compounding (mixing) stage. Without wishing to be limited by theory, it is proposed that ion exchange enhances the layered IOHs compatibility with polyamides compared with unmodified inorganic layered materials. This heightened compatibility in combination with sufficient mixing forces, appropriate mixing sequence, screw design and time allows the organically modified platelets associated with the IOH to be at least partially exfoliated into the polyamide and hence dispersed at least partially on a nanometer scale. This process also provides a useful mechanism of dispersing into the polyamide any neutral molecules associated with the IOH on a molecular level.

Dispersion of the various components of the fire resistant formulation including the IOH is aided by grinding prior to mixing. Grinding is achieved using any suitable grinding equipment including ball mills, ring mills and the like. It is preferable that the components including the IOH is ground to a particle size less than about 200 microns, more preferably less than about 50 microns, most preferably less than about 20 microns. The hybrid material may also be ground using specialty grinding equipment allowing grinding to nanometer sizes.

Dispersion may be affected using any suitable melt, solution or powder based mixing process allowing sufficient shear rate, shear stress and residence time to disperse the IOH at least partially on a nanometer scale. Such processes may be conducted using milling procedures such as ball milling, in a batch mixer using internal mixers, such as, Banbury and Brabender/Haake type mixers, kneaders, such as, BUS kneaders, continuous mixing processes including continuous compounders, high intensity single and twin screw extrusion.

Melt processing is preferred and in a particularly preferred embodiment, twin screw extruders with an L:D ratio of at least about 24, preferably more than about 30 equipped with at least one and preferably multiple mixing and venting zones are employed for dispersion. Such screw configurations useful for dispersive and distributive mixing are well known to those in the art. A particularly useful system has been found to be that illustrated in FIG. 1.

The components of the formulation may be added in any order or at any point along the extruder barrel. Since polyamides are susceptible to hydrolysis it is preferable that the components are dried prior to processing and/or mechanisms to remove water vapor such as vents or vacuum ports available during processing. In a preferred embodiment, all of the components are added at one end of the extruder. In another preferred embodiment, a polymeric binder and optionally minor components are added at one end of the extruder and the IOH and optionally minor components at a later point/s. In still another preferred embodiment, the IOH portion of the polymeric binder and optionally minor components are added at one end of the extruder with the remaining portion of the polymeric binder and optionally minor components are added at a later point/s. Following extrusion the molten composition is cooled by means of water bath, air knife or atmospheric cooling and optionally cut into pellets.

Preferably all of the major and minor components of the system can be combined in as few a mixing steps as possible, most preferably in a single mixing step.

The moulding or forming of the polyamide formulation into fire resistant articles or parts thereof can be carried out using any method known to those in the art including processes such as extrusion, injection moulding, compression moulding, rotational moulding, blow moulding, sintering, thermoforming, calending or combinations thereof.

In one embodiment of the invention the fire resistant polyamide system containing the major and minor components is moulded or formed into parts having wall thickness less than about 25 mm, preferably less than about 5 mm, most preferably less than 1.5 mm. Such parts include but are not limited to tubes, complex moulded hollow parts, sheets and complex moulded sheets and other complex objects that are moulded or formed using techniques, such as, extrusion, injection moulding thermoforming and rotational moulding.

In the simplest process, the article or part is directly produced during compounding for example by locating a die at the end of the extruder allowing the shape of the extrudate to be modified as required. Examples of such components include simple parts such as film, tape, sheet, tube, rod or string shapes. The process may also involve multiple layers of different materials one of which being the said polymeric system built up by processes known to those in the art including co-extrusion.

In another preferred embodiment, the formulation is moulded or formed in a separate step using techniques such as injection, compression or blow moulding. Such parts are generally more complex in nature compared with parts formed by extrusion alone, their design only limited by the requirements of the moulding tool/process employed. Suitable examples include but are not limited to stowage bin hinge covers, ECS duct spuds, latches, brackets, passenger surface units and the like.

It is noted that for certain applications it may be preferable that the fire resistant polyamide formulation is ground to a powder. In such cases it has unexpectedly been found that grinding of the said formulation using cryogenic or atmospheric grinding techniques known to those in the art may be carried out without significantly effecting the performance of the system. Such moulding applications include selective laser sintering, rotational moulding, and extrusion. Suitable examples including but not limited to environmental control systems (air-conditioning ducts) and the like.

In other preferred applications, the polymeric formulation may be first formed into a sheet or film, for example, through extrusion, blow moulding, compression moulding or calending. The sheet may be subsequently moulded to a desired shape using thermoforming techniques. In yet another application, the sheet or film may be used to prepare reinforced thermoplastic laminates with woven fabrics prepared from surface modified or natural glass, carbon or aramid using techniques such as compression moulding or resin infusion/transfer. Again, the laminate sheet hence formed may be further moulded to a desired shape using techniques such as thermoforming.

Alternatively the formulation may be spun into fibres by any method known to those skilled in the art. Such a process provides a method for producing fire resistant fabrics, carpets and alike The present invention is useful for producing polyamide materials with favourable rheological properties for moulding including thin or intricate articles or parts thereof which maintain mechanical properties close to or exceeding that of the virgin polyamide matrix and which show improved fire performance in standard tests through resisting combustion by self-extinguishing when ignited, limiting flame propagation, and generating low smoke and toxic gas emissions. Such articles or parts thereof are useful for applications which require superior fire performance and in industries that are regulated for fire performance including transport, for example, air, automotive, aerospace and nautical; building and construction; and electrical or optical, for example, cables, wires and fibres.

BRIEF DESCRIPTION OF THE DRAWINGS

In the examples, reference will be made to the accompanying drawings in which.

EXAMPLES

The invention will now be described with reference to the following non-limiting examples.

General Conditions & Reagents

Tables 1, 2 and 3 Outline General Reagents, Conditions & Procedures associated with the examples.

TABLE 1

Commercially Available Reagents

| Reagent | Trade name | Supplier |
|---|---|---|
| Montmorillonite - organic modified | Cloisite 93A | Southern Clay |
| Montmorillonite - organic modified | Cloisite 30B | Southern Clay |
| Montmorillonite | Cloisite Na+ | Southern Clay |
| Synthetic Hectorite | Laponite | Southern Clay |
| Nylon12 | Vestamid 9005 | Degussa |
| Nylon12 FR (Flame retarded) | Vestamid 7166 | Degussa |
| Polyetherimide | Ultem 9075 | GE Plastics |
| Nylon6 | Akulon PA6 | DSM |
| Nylon66 | Akulon PA66 | DSM |
| Cyanuric acid | Cyanuric acid | Aldrich |
| Melamine cyanurate | Fyrol MC | Akzo-Nobel |
| Melamine phosphate | Fyrol MP | Akzo-Nobel |
| Melamine polyphosphate | Melapur 200 | DSM Melapur |
| Melamine | Melamine | Aldrich |
| Pentaerythritol | Pentaerythritol | Aldrich |
| Magnesium hydroxide | Magnifin | Martinswerk |
| Ammonia polyphosphate | Antiblaze MC | Rhodia |
| Pentaerythritol phosphate | NH-1197 | Great Lakes |
| Pentaerythritol phosphate Blend | NH-1511 | Great Lakes |

TABLE 1-continued

Commercially Available Reagents

| Reagent | Trade name | Supplier |
|---|---|---|
| Zinc borate | Fire Brake ZB | US Borax |
| Zn Stearate | Zincum | Baerlocher |
| Ca Stearate | Ceasit | Baerlocher |
| Int 38 | Synthetic resin | AXEL |
| LuWax Eas1 | Ethylene co-polymer | BASF |
| Irganox b1171 | Phosphite/hindered phenol blend | CIBA |

TABLE 2

Processing Equipment and Conditions

Figure 1:
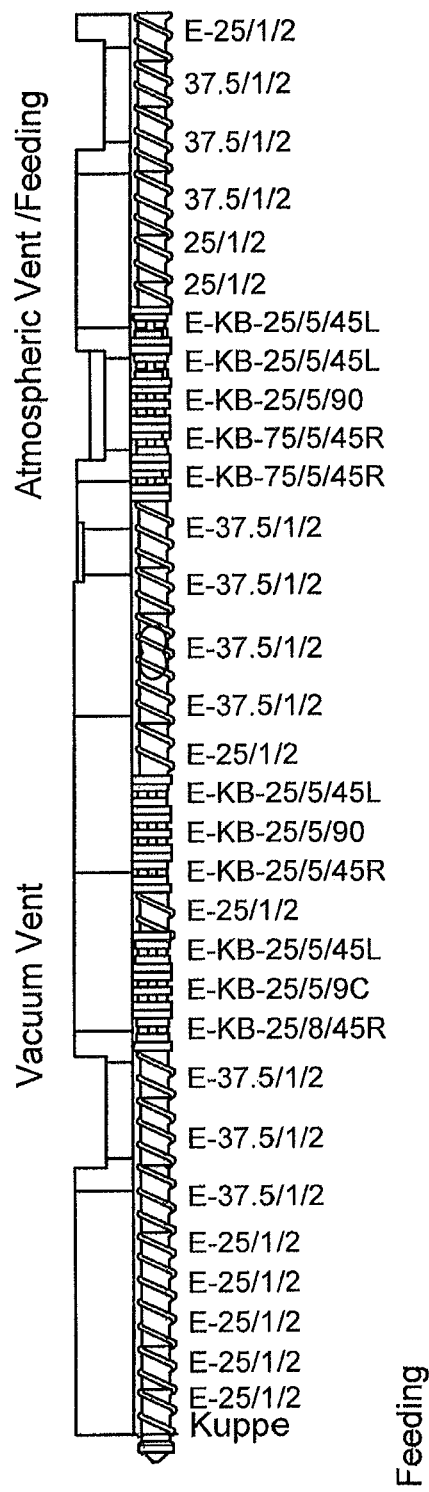
FIG. 1 is a diagram showing the twin screw extruder screw and barrel configuration.

| Equipment | Type |
|---|---|
| Twin screw extruder | Berstorff ZE 25 mm modular co-rotating twin screw extruder coupled to a Haake Rheocord motor drive and torque cell for rheology measurement<br>L:D ratio = 36:1<br>Screw and barrel configuration presented in FIG. 1,<br>Screw speed 300 rpm<br>Feed rate ~1.2 Kg/hour<br>Residence time average 2 min<br>Flat 200° C. temperature profile from throat to die (nylon12)<br>Flat 250° C. temperature profile from throat to die (nylon6)<br>Flat 275° C. temperature profile from throat to die (nylon66) |
| Batch Mixer | Haake R3000 batch mixer connected to torque rheological load cell, pneumatic ram, roller rotors<br>Rotor speed - 5 min 60 rpm, 10 min 120 rpm<br>Temperature 190° C. |
| Injection Moulding | Battenfeld 80 ton BA 800 CDC injection moulding machine<br>Temperature profile:<br>Nylon 12 Zone 1 2 3 Nozzle Die<br>Temp (° C.)         215 220 225 225 70° C.<br>Nylon 6 Zone 1 2 3 Nozzle Die<br>Temp (° C.)         230 230 250 260 90° C.<br>Nylon 66 Zone 1 2 3 Nozzle Die<br>Temp (° C.)         260 260 280 290 90° C.<br>ASTM test samples:<br>Injection pressure gradient 800 to 600 bar, cavity pressure 400 bar, Holding pressures 600 to 0 bar<br>Cooling time 30 sec<br>Cone Calorimetry Samples:<br>Injection pressure gradient 950 to 650 bar, cavity pressure 325 bar, Holding pressures 650 to 0 bar<br>Cooling tine 60 sec |
| Compression Moulding | Assett 2.5 MPa pneumatic press, 45 cm platens, heating (400° C.) and cooling<br>Moulding platen temperature 220° C. nylon12<br>Moulding platen temperature 260° C. nylon6<br>Moulding platen temperature 290° C. nylon66 |

TABLE 3

Characterization Techniques, Conditions and Sample Preparations

| Equipment | Type |
|---|---|
| X-ray diffraction (XRD) | Phillips PW 1729, $CuK_{\alpha 1}$ source $\lambda = 0.154$ nm<br>Powders were ground to a particle size of less than 100 micron,<br>Plastics were compression moulded (210° C.) to a thickness of 100 micron |
| Transmission Electron Microscopy (TEM) | Hitachi H-7500 operating at an electron potential of 120 kV<br>100 nm thick sections were prepared by ultra microtomy |
| Differential Scanning Calorimetry (DSC) | Cryogenic TA 2920 MDSC employing Advantage software, 10° C. and 20° C./min ramp rate rates for heating and cooling for general thermal and glass transition respectively.<br>Calibrated against, Indium, distilled water, cyclohexane and sapphire<br>Powders were ground to a particle size of less than 100 micron.<br>Plastics were compression moulded (210° C.) to a thickness of 100 micron with quench cooling, 5 mm diameter specimens were punched from the moulded sheet |
| Thermal Gravimetric Analysis (TGA) | Thermal Sciences, PL-STA, referenced against $Al_2O_3$<br>Heating rate ramp10° C./min<br>Powders were ground to a particle size of less than 100 micron<br>Plastics were compression moulded (210° C.) to a thickness of 100 micron with quench cooling, 4 mm diameter specimens were punched from the moulded sheet |
| Cone Calorimetry Testing | ASTM E 1354-92<br>Modified from the original Stanton-Redcroft model, employing CSIRO developed software<br>Radiant flux 35 $kW/m^2$, 3 repeats per sample, ASTM E1356<br>Following injection moulding, samples (100 × 100 × 6 mm) were conditions for 7 days at 23° C. at 50% RH.<br>Heat release, smoke, mass loss and gas emission were measured |
| Radiant Panel | Conducted as per FAA specification (DOT FAA/AR-0012) & as outlined in ASTM E648-93a |
| Specific Optical Density of smoke Generated By combustion Solid Materials and gas emission | ASTM E662-93 for optical density with gas released by samples during the test analyzed for HF, HCl, HCN, $H_2S$, $NO_x$, HBr, $PO_4$, $SO_2$ |

TABLE 3-continued

Characterization Techniques, Conditions and Sample Preparations

| Equipment | Type |
|---|---|
| Vertical Burn | Vertical burn tests according to UL94 or FAA specifications.<br>UL94 specification -<br>One 10 sec application of flame from a 10 mm burner to<br>125 × 12.3 × 3.2 mm samples according to UL specifications 2000.<br>Flame extinguish times were monitored over at least 3 samples<br>Extinguishing times,   VO < 10 s,  V1 < 30 s,  V2 < 30 s<br>Cotton Wool Ignition       No           No         Yes<br>FAA (DOT FAA/AR-0012) and ASTM F501-93<br>12 s burn<br>One 12 s application of flame from a 10 mm burner to 300 × 75 mm<br>samples according to FAA specification 2000: sample<br>thickness specified<br>Pass FAA test requirement:<br>Flame extinguished    <15 sec<br>Drip extinguished      <5 sec<br>Burn height            <203 mm<br>60 s burn<br>One 60 s application of flame from a 10 mm burner to<br>300 × 75 mm samples according to FAA specification 2000<br>Pass FAA test requirement:<br>Flame extinguished    <15 sec<br>Drip extinguished      <3 sec<br>Burn height            <150 mm<br>Sample thickness specified |
| IZOD Notched Impact Testing | Radmana ITR 2000 instrumented impact tester<br>Izod mode, Iact strain rate 3.5 ± 0.2 m/sec<br>10 repeats per sample, ASTM 256<br>Following injection moulding, samples were stored for 24 h in<br>desiccated containers, notched according to the ASTM 256<br>standard and tested 'dry as moulded standard deviation<br>generally less than 8% |
| Tensile Testing | Instron tensile testing apparatus (5565) utilizing a 30 kN load<br>cell, 50 mm/min strain rate<br>5 repeats per sample as per ASTM D638<br>External extensometer used for independent modulus<br>measurements ASTM D5938<br>Following injection moulding, samples were stored for 24 h in<br>desiccated containers and tested 'dry as moulded Generally<br>standard deviation less than 2% for modulus and strength results |
| MFI | MFI testing was completed according to ASTM D1238<br>standards employing 2.16 load at a temperature of 235° C.,<br>Employing a Davenport Melt Flow Indexer apparatus |
| Parallel Plate Rheology | The viscosities of samples were measured over a wide range of<br>shear rate range of $10^{-2}$ to $10^1$ s$^{-1}$ at 240° C. Tests of shear rate<br>sweep were carried out using a shear strain-controlled<br>rheometer, RDA II (Rheometric Scientific Inc.). The test fixture<br>geometry used was 25 mm parallel-plate with a constant gap<br>between 0.6-0.8 mm. The nitrogen gas was used to provide an<br>inert testing environment to reduce sample degradation due to<br>oxidation of samples. |

Methods for Preparing Inorganic-Organic Hybrids (IOH)—Examples 1-6

Example 1

Preparation of melamine hydrochloride modified montmorillonite (IOH1)

Montmorillonite exchanged Na$^+$ (Cation Exchange Capacity (CEC)=92 meg/100 g) was suspended in 80° C. DI water (2% w/w) and mechanically stirred at 1500 rpm for 60 min. Melamine monohydrochloride salt (1.4 mmol/100 g montmorillonite) was then added to the solution and the resultant suspension allowed to cool with continued stirring for a further 150 min. Following filtration of the suspension, the precipitate was thoroughly washed with warm DI water and then preliminary dried (60-80° C.) The resultant granular organically modified clay was ground to a particle size of less than 50 micron and then further dried at 75° C. prior to processing or analysis.

| | XRD (CuK$_{\alpha1}$ source $\lambda$ = 0.154 nm) | |
|---|---|---|
| Cation | Na$^+$ | Melamine•HCl modified Montmorillonite |
| XRD d$_{001}$ | 1.10 nm | 1.27 nm |

Results indicate that with ion exchange montmorillonite's intergallery spacing is increased from 1.10 nm to 1.27 nm. This result is consistent with sodium ions being replaced by protonated melamine ions in the in region during ion exchange.

Example 2a

Preparation of melamine hydrochloride modified montmorillonite in the presence of melamine (IOH2)

Montmorillonite exchanged Na$^+$ (Cation Exchange Capacity (CEC)=92 meq/100 g) was suspended in 80° C. DI water (2% w/w), melamine added (1.4 mmol/100 g montmorillonite) and the solution mechanically stirred at 1500 rpm for 60 min. Melamine monohydrochloride salt (1.4 mmol/100 g montmorillonite) was then added to the solution and the resultant suspension allowed to cool with continued stirring for a further 150 min. Following filtration of the suspension, the precipitate was thoroughly washed with warm DI water and then preliminary dried (60-80° C.) The resultant granular organically modified clay was ground to a particle size of less than 50 micron and then further dried at 75° C. prior to processing or analysis.

| XRD (CuK$_{\alpha 1}$ source $\lambda$ = 0.154 nm) | | |
| --- | --- | --- |
| Cation | Na$^+$ | Melamine and Melamine•HCl modified montmorillonite |
| XRD d$_{001}$ | 1.10 nm | 1.39 nm |

Results indicate that montmorillonite modified by melamine hydrochloride in the presence of melamine has an expanded intergallery spacing compared with both montmorillonite that is modified with melamine hydrochloride or sodium ions alone. The result is consistent association/entrapment of the neutral melamine with the clay during ion exchange.

Example 2b

Preparation of melamine hydrochloride modified montmorillonite in the presence of melamine (IOH2)

3.0 Kg of sodium montmorillonite was dispersed into 200 L de-ionized water at 60° C. with vigorous stirring (200 rpm) adding the powder slowly over a period of approximately one hour to assist wetting out of the individual particles/platelets. After the suspension had stirred at that temperature for approximately 2 hours, an aqueous solution (35 L) containing 1.39 Kg melamine and 0.92 L HCl (9.65M) at 85° C. was rapidly added whilst the impeller speed was simultaneously increased to 300 rpm. After an initial period of high viscosity whilst the modified montmorillonite aggregated, the viscosity decreased and the clay solution was allowed to stir for a further 3 hours at 60° C. Following filtration of the suspension the collected modified clay was re-dispersed into de-ionized water (150 L) and allowed to stir for 1 hour at 60° C. before an aqueous solution (10 L) containing 0.385 Kg melamine and 0.26 L HCl (9.65M) at approx 85° C. was added. At this point the mixture was stirred for a further two hours before it was filtered. Next the modified clay was re-dispersed into de-ionized water (150 L) and stirred for a further 1 hour at 60° C. prior to filtration, drying and grinding of the modified clay to a particle size less than 50 micron.

| XRD (CuK$_{\alpha 1}$ source $\lambda$ = 0.154 nm) | | |
| --- | --- | --- |
| Cation | Na$^+$ | Melamine and Melamine•HCl modified Montmorillonite |
| XRD d$_{001}$ | 1.10 nm | 1.40 nm |

These results illustrate that the robustness of the modification procedure to variation in mole ratio of montmorillonite CEC to melamine salt and melamine and the reaction conditions employed to carry out the modification procedure. This result is consistent association/autrapment of the neutral melamine with the clay during ion exchange.

Example 2c

Preparation of melamine hydrochloride modified montmorillonite in the presence of melamine (IOH2)

15.0 Kg of montmorillonite was dispersed into 200 L de-ionized water at 60° C. with vigorous stirring (200 rpm) adding the powder slowly over a period of approximately 2 hours to assist wetting out of the individual particles/platelets. After the suspension had stirred at that temperature for approximately 4 hours, an aqueous solution (50 L) containing 2.78 Kg melamine and 1.84 L HCl (9.65 M) at 85° C. was rapidly added whilst the impeller speed was simultaneously increased to 300 rpm. After an initial period of high viscosity whilst the modified montmorillonite aggregated, the viscosity decreased and the clay solution was allowed to stir for a further 3 hours at 60° C. Following filtration of the suspension the collected modified clay was re-dispersed into de-ionized water (150 L) and allowed to stir for 1 hour at 60° C. before an aqueous solution (25 L) containing 1.925 Kg melamine and 1.3 L HCl (9.65M) at approx 85° C. was added. At this point the mixture was stirred for a further two hours before it was filtered. Next the modified clay was re-dispersed into de-ionized water (200 L) and stirred for a further hour at 60° C. prior to filtration, drying and grinding of the modified clay to a particle size less than 50 micron.

| XRD (CuK$_{\alpha 1}$ source $\lambda$ = 0.154 nm) | | |
| --- | --- | --- |
| Cation | Na$^+$ | Melamine and Melamine•HCl modified Montmorillonite |
| XRD d$_{001}$ | 1.10 nm | 1.40 nm |

Results illustrate the robustness of the modification procedure to variation in reaction conditions employed to carry out the modification procedure. This result is consistent with association/entrapment of the neutral melamine molecules with the clay during ion exchange.

Example 3

Preparation of melamine cyanurate hydrochloride modified montmorillonite (IOH3)

Na$^+$ exchanged montmorillonite (Cation Exchange Capacity (CEC)=92 meq/100 g) was suspended in 95° C. distilled water (2% w/w), cyanuric acid added (1.4 mmol/100 g montmorillonite) and the solution mechanically stirred at 1500 rpm for 60 min. Melamine mono-hydrochloride salt (1.4 mmol/100 g montmorillonite) was then added to the solution and the resultant suspension with continued stirring for a further 150 min. Following filtration of the suspension, the precipitate was thoroughly washed with warm distilled water and then preliminary dried (75° C.). The resultant granular organically modified clay was ground to a particle size of less than 45 micron and then further dried at 60-80° C. prior to processing or analysis.

| XRD (CuK$_{\alpha 1}$ source $\lambda$ = 0.154 nm) | | |
| --- | --- | --- |
| Cation | Na$^+$ | Melamine cyanurate•HCl modified montmorillonite |
| XRD d$_{001}$ | 1.10 nm | 1.42 nm |

Results from Example 3 indicate that the intergallery spacing of montmorillonite is expanded further when exchanged with melamine cyanurate ion compared with sodium ion or melamine ion modified montmorillonite alone (Example 1) due to its larger size and hence steric impact.

Example 4

Preparation of melamine and melamine cyanurate modified montmorillonite in presence of melamine and melamine cyanurate (IOH4)

Montmorillonite exchanged $Na^+$ (Cation Exchange Capacity (CEC)=92 meq/100 g) was suspended in 95° C. distilled water (2% w/w), cyanuric acid added (1.4 mmol/100 g montmorillonite) and the solution mechanically stirred at 1500 rpm for 60 min. Melamine monohydrochloride salt (1.4 mmol/100 g montmorillonite) and melamine (1.4 mmol/100 g montmorillonite) was then added to the solution and the resultant suspension continued stirring for a further 150 min. Following filtration of the suspension, the precipitate was thoroughly washed with warm distilled water and then preliminary dried under vacuum (75° C.). The resultant granular organically modified clay was ground to a particle size of less than 45 micron and then further dried at 60-80° C. prior to processing or analysis.

| XRD ($CuK_{\alpha 1}$ source λ = 0.154 nm) | | |
|---|---|---|
| Cation | $Na^+$ | Melamine and Melamine cyanurate•HCl modified montmorillonite |
| XRD $d_{001}$ | 1.10 nm | 1.53 nm |

The results from Example 4 indicate that the intergallery spacing of montmorillonite exchanged with melamine cyanurate ion in the presence of melamine and melamine cyanurate is larger than both sodium ion or melamine cyanurate ion exchanged montmorillonite alone (Example 3). This result is consistent with association/entrapment of the neutral melamine and melamine cyanurate with the clay during ion exchange.

Example 5

Preparation of melamine and trimethyl cetylammonium and melamine hydrochloride modified montmorillonite (IOH5)

Montmorillonite exchanged $Na^+$ (Cation Exchange Capacity (CEC)=92 meq/100 g) was suspended in 90° C. distilled water (2% w/w), and the solution mechanically stirred at 1500 rpm for 60 min. Melamine monohydrochloride salt (1.4 mmol/100 g montmorillonite) and trimethylcetylammoniun chloride (1.4 mmol/100 g montmorillonite) was then added to the solution and the resultant suspension allowed to cool with continued stirring for a further 150 min. Following filtration of the suspension, the precipitate was thoroughly washed with warm distilled water and then preliminary dried under vacuum (75° C.). The resultant granular organically modified clay was ground to a particle size of less than 45 micron and then further dried at 60-80° C. prior to processing or analysis.

| XRD ($CuK_{\alpha 1}$ source λ = 0.154 nm) | |
|---|---|
| Cation | XRD $d_{001}$ |
| $Na^+$ | 1.10 nm |
| Trimethylcetylammonium chloride | 1.84 nm |
| Melamine and Trimethylcetylammonium chloride modified montmorillonite | 1.68 nm |

The results from Example 5 indicate that the intergallery spacing of montmorillonite exchanged with both trimethylcetylammonium chloride and melamine hydrochloride is larger than sodium but smaller than trimethylcetylammonium ion exchanged montmorillonite. This result is consistent with trimethylcetylammonium chloride and melamine hydrochloride being present in the intergallery spacing of the modified montmorillonite.

Example 6

Preparation of melamine and melamine hydrochloride modified synthetic hetorite, laponite (IOH6)

Hectorite clay (Synthetic Laponite RD) was modified using the same general procedure as employed in Example 2 taking into consideration its lower cation exchange capacity (CEC) of 55 mmol/100 g and employing a 1% solution for modification. Strict control was placed over the mole ratio of hectorite CEC and melamine salt to encourage platelet agglomeration. Following treatment with the melamine salt/melamine, the modified synthetic clay was separated from the treatment solution by filtration.

| XRD ($CuK_{\alpha 1}$ source λ = 0.154 nm) | | |
|---|---|---|
| Cation | $Na^+/Li^+$ | Melamine and Melamine•HCl Modified Hectorite |
| XRD $d_{001}$ | 1.20 nm | 1.33 nm |

The results from Example 6 indicate that the intergallery spacing of synthetic hectorite exchanged with melamine hydrochloride in the presence of melamine is larger than sodium changed montmorillonite.

Melt Dispersion of Components and Formulation of Fire Resistant Materials Examples 7-20

While each of the following examples use Nylon12, Nylon6 or Nylon66 as the polyamide based matrix, the person skilled in the art will appreciate that the examples for fire retarding nylon12, nylon6 and nylon66 are also applicable to other types of polyamides, polyamide co-polymers, polyamide blends, alloys and the like.

The formulation constituents employed in Examples 7 to 20 are provided in Tables 4a to 4e.

TABLE 4a

Formulations used in Examples 7 to 20

| Formulation | Nylon12 | Cloisite $Na^+$ | Cloisite 30B | Cloisite 93A | IOH2 (Example 2) | Melamine Cyanurate |
|---|---|---|---|---|---|---|
| 1 | 99.25 | | 0.75 | | | |
| 2 | 98.5 | | 1.5 | | | |
| 3 | 95 | | 5.0 | | | |
| 4 | 93 | | 7.0 | | | |
| 5 | 95 | | | | 5 | |
| 6 | 95 | 5 | | | | |
| 7 | 82 | | 3 | | | 15 |

TABLE 4a-continued

Formulations used in Examples 7 to 20

| Formulation | Nylon12 | Cloisite Na+ | Cloisite 30B | Cloisite 93A | IOH2 (Example 2) | Melamine Cyanurate |
|---|---|---|---|---|---|---|
| 8 | 83.5 | | 1.5 | | | 15 |
| 9 | 84.25 | | 0.75 | | | 15 |
| 10 | 85 | | | | | 15 |
| 11 | 82 | | | | 3 | 15 |
| 12 | 83.5 | | | | 1.5 | 15 |
| 13 | 84.25 | | | | 0.75 | 15 |
| 14 | 84.5 | | | | 3 | 12.5 |
| 15 | 86 | | | | 1.5 | 12.5 |
| 16 | 86.75 | | | | 0.75 | 12.5 |
| 17 | 87 | | | | 3 | 10 |
| 18 | 88.5 | | | | 1.5 | 10 |
| 19 | 89.25 | | | | 0.75 | 10 |
| 20 | 90.5 | | | | 3 | 7.5 |
| 21 | 91 | | | | 1.5 | 7.5 |
| 22 | 91.75 | | | | 0.75 | 7.5 |

TABLE 4b

Formulations used in Examples 7 to 20

| Formulation | Nylon12 | IOH2 (Example 2) | Melamine Cyanurate | Magnesium Hydroxide (H7) | Melamine phosphate | Melamine poly phosphate | Melamine phthalate | Ammonia poly phosphate | Pentaerythritol phosphate | Pentaerythritol phosphate blend |
|---|---|---|---|---|---|---|---|---|---|---|
| 23 | 83.5 | 1.5 | | 15 | | | | | | |
| 24 | 83.5 | 1.5 | | | 15 | | | | | |
| 25 | 83.5 | 1.5 | | | | 15 | | | | |
| 26 | 83.5 | 1.5 | | | | | 15 | | | |
| 27 | 83.5 | 1.5 | | | | | | 15 | | |
| 28 | 83.5 | 1.5 | | | | | | | 15 | |
| 29 | 83.5 | 1.5 | | | | | | | | 15 |
| 30 | 83.5 | 1.5 | 10 | 5 | | | | | | |
| 31 | 87.5 | | 12.5 | | | | | | | |
| 32 | 98.5 | 1.5 | | | | | | | | |

TABLE 4c

Formulations used in Examples 7 to 20

| Formulation | Nylon12 | IOH2 (Example 2) | Melamine cyanurate | Magnesium hydroxide (H7) | Magnesium hydroxide (H10) | Magnesium hydroxide (H5iv) | Magnesium hydroxide (H10iv) |
|---|---|---|---|---|---|---|---|
| 33 | 82 | 3 | 12.5 | 2.5 | | | |
| 34 | 83.5 | 1.5 | 12.5 | 2.5 | | | |
| 35 | 84.25 | 0.75 | 12.5 | 2.5 | | | |
| 36 | 82 | 3 | 10 | 5 | | | |
| 37 | 84.25 | 0.75 | 10 | 5 | | | |
| 38 | 82 | 3 | 7.5 | 7.5 | | | |
| 39 | 83.5 | 1.5 | 7.5 | 7.5 | | | |
| 40 | 84.25 | 0.75 | 7.5 | 7.5 | | | |
| 41 | 83.5 | 1.5 | 12.5 | | 2.5 | | |
| 42 | 83.5 | 1.5 | 12.5 | | | 2.5 | |
| 43 | 83.5 | 1.5 | 12.5 | | | | 2.5 |

TABLE 4d

Formulations used in Examples 7 to 20

| Formulation | Nylon12 | Nylon6 | Nylon66 | IOH1 (Example 1) | IOH2 (Example 2) | IOH4 (Example 4) | IOH5 (Example 5) | Melamine cyanurate |
|---|---|---|---|---|---|---|---|---|
| 44 | 88.5 | | | 1.5 | | | | 10 |
| 45 | 83.5 | | | 1.5 | | | | 15 |
| 46 | 88.5 | | | | | 1.5 | | 10 |
| 47 | 83.5 | | | | | 1.5 | | 15 |
| 48 | | 84.25 | | | 0.75 | | | 15 |
| 49 | | | 84.25 | | 0.75 | | | 15 |
| 50 | 84.25 | | | | | | 0.75 | 15 |

TABLE 4e

Formulations used in Examples 7 to 20

| Formulation | Nylon12 | IOH2 (Example 2) | Melamine cyanurate | Calcium stearate | Zinc Stearate | Int38 | Luwax EAS1 | Irganox |
|---|---|---|---|---|---|---|---|---|
| 51 | 83.25 | 0.75 | 15 | 1 | | | | |
| 52 | 82.25 | 0.75 | 15 | 2 | | | | |
| 53 | 83.25 | 0.75 | 15 | | 1 | | | |
| 54 | 82.25 | 0.75 | 15 | | 2 | | | |
| 55 | 82.25 | 0.75 | 15 | | | 2 | | |
| 56 | 82.25 | 0.75 | 15 | | | | 2 | |
| 57 | 83.75 | 0.75 | 15 | | | | | 0.5 |

Example 7

Figure 2:
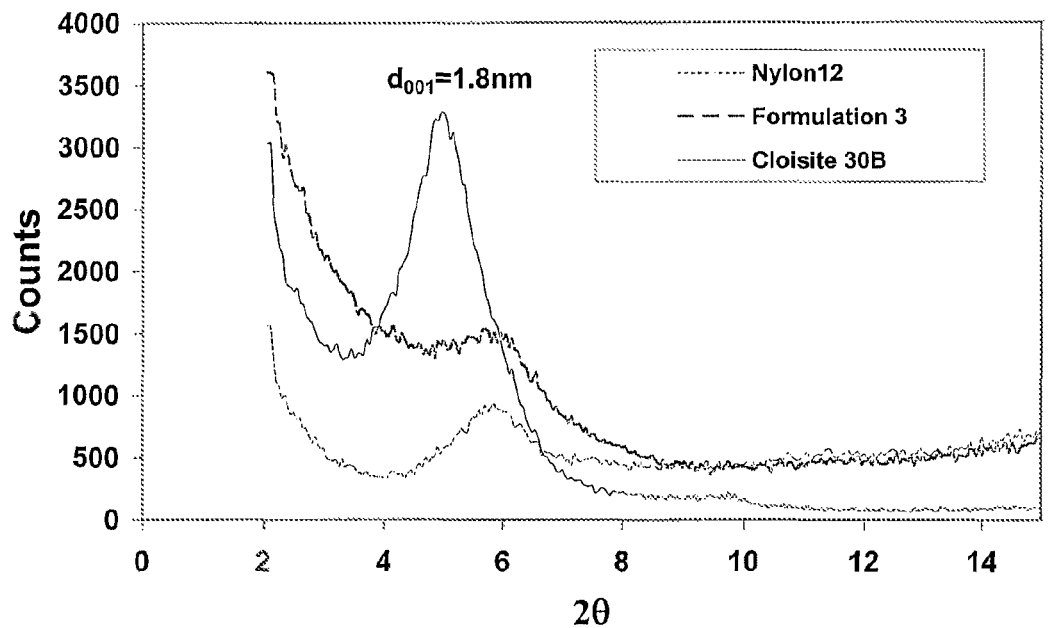
FIG. 2 is a graph showing the XRD results and transmission electron microscope (TEM) image for Example 7.
Figure 2:
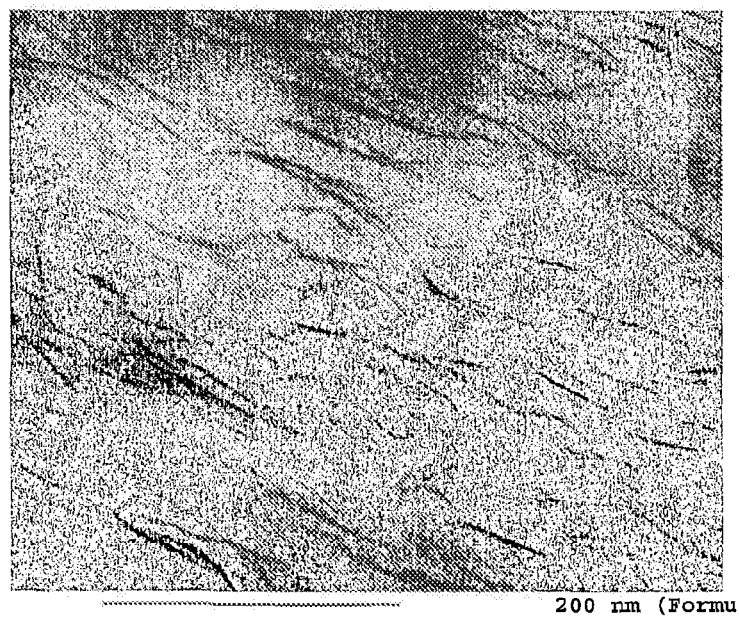

Processing rheology (Table 5), XRD & TEM (FIG. 2), mechanical (Table 6) and fire performance (Tables 7 & 8) of nylon12 modified with commercially available clay during melt processing.

The following example indicates that the processing rheology of Nylon 12 is not affected by the melt dispersion of commercially available 'organoclay' at least partially on a nanometer scale (XRD). This dispersion results in improved mechanical performance and heat release rate as determined by cone calorimetry but poor performance compared with conventional flame retarded nylon 12(Nylon12 FR) in terms of vertical burn results which is a primary tool used to discriminate material fire performance by governing bodies such as UL, ASTM, FAA and the like. As such these materials do not meet such performance standards

TABLE 5

Torque Rheology

Extrusion Torque Rheology

| Formulation | Nylon12 | 1 | 2 | 3 | 4 |
|---|---|---|---|---|---|
| Torque (Nm) | 105 | 100 | 95 | 91 | 87 |

Batch mixer torque rheology

| Formulation | Nylon12 | 3 | 5 | 6 |
|---|---|---|---|---|
| Torque (Nm) | 47 | 44 | 47 | 49 |

TABLE 6

Mechanical Performance

| Formulation | Nylon12 | Nylon12 FR | 1 | 2 | 3 | 4 |
|---|---|---|---|---|---|---|
| Modulus (MPa) | 1110 | 1712 | 1187 | 1227 | 1470 | 1700 |
| Tensile Strength (MPa) | 36 | 48 | 53 | 52.3 | 57 | 44.6 |
| Impact (k/m$^2$) | 4006 | 2200 | 6200 | 8100 | 6700 | 3700 |

TABLE 7

Fire Testing Cone Results

| Formulation | Peak Heat Rel$^d$ kW/m$^2$ | Mass Loss Rate g/m$^2$s | CO Prod$^n$ Kg/Kg | CO$_2$ Prod$^n$ Kg/Kg | SEA (Smoke) m$^2$/Kg |
|---|---|---|---|---|---|
| Nylon 12 FR | 1800 | 18.6 | 0.01 | 1.2 | 100 |
| Nylon12 | 1344 | 17.1 | 0.03 | 1.6 | 385 |
| 1 | 740 | 13.3 | 0.01 | 1.0 | 360 |
| 2 | 620 | 12.8 | 0.02 | 1.5 | 382 |
| 3 | 536 | 10.8 | 0.02 | 1.5 | 382 |
| 4 | 447 | 10.0 | 0.02 | 1.5 | 410 |

TABLE 8

Vertical Burn Results

| Formulation | UL94 (3.2 mm) | FAA (1.6 mm) |
|---|---|---|
| Nylon 12 FR | V0 | Pass |
| Nylon12 LV | HB | Fail |
| 1 | V2 | Fail |
| 2 | V2 | Fail |
| 3 | V1 | Fail |
| 4 | V1 | Fail |

Example 8

Figure 3:
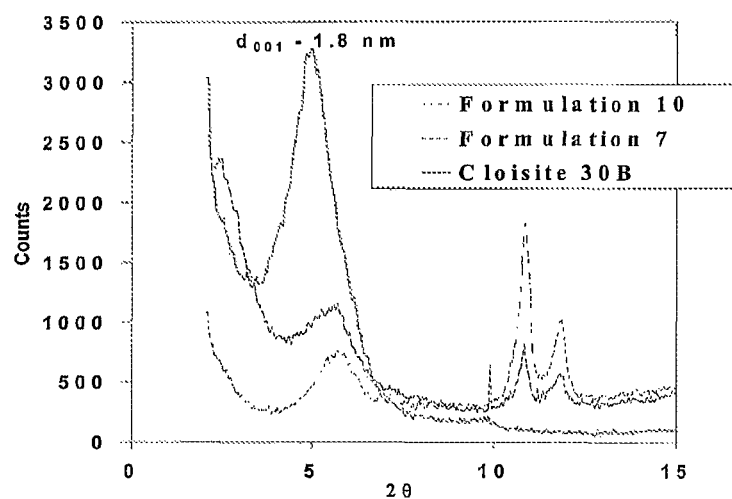
FIG. 3 is a graph showing the XRD results for Example 8.

Processing (Table 9), XRD (FIG. 3), mechanical (Table 10) and fire performance (Table 11-14) of nylon12 modified with commercially available clay and flame retarding additives (melamine cyanurate) during melt processing The following example indicates that the processing rheology of Nylon 12 is not effected by the melt dispersion of commercially available 'organoclay' at least partially on a nanometer scale (XRD) and flame retardant. This dispersion results in improved mechanical performance reduced heat release results via cone calorimetry and vertical burn performance for specimens greater than 1.6 mm thickness compared with conventionally flame retarded nylon12. Although samples of 0.75 mm thickness provide good smoke and toxic gas release results they fail FAA type 12 sec vertical burn testing and perform badly in radiant panel tests. This indicates that the strategy is not satisfactory to meet the performance of thin parts to the performance requirements of governing bodies such as the FAA.

TABLE 9

Processing Rheology

| Formulation | Torque (Nm) |
|---|---|
| Nylon 12 | 105 |
| 7 | 102 |

TABLE 9-continued

Processing Rheology

| Formulation | Torque (Nm) |
| --- | --- |
| 8 | 104 |
| 9 | 107 |

TABLE 10

Mechanical Peformance

| Formulation | Tensile Modulus (MPa) | Tensile Strength (MPa) | Elongation at break (%) | Notched Impact Strength (J/m$^2$) |
| --- | --- | --- | --- | --- |
| Nylon12 | 1110 | 36 | 640 | 4600 |
| Nylon12 FR | 1712 | 48.1 | 77 | 2100 |
| 7 | 1505 | 38.5 | 54 | 3100 |
| 8 | 1471 | 38.1 | 222 | 4100 |
| 9 | 1380 | 38.1 | 291 | 4600 |

Standard Deviation - Modulus < 4%, Strength < 3%, Elongation < 10%, Impact < 11%

TABLE 11

Fire Testing Cone Calorimetry

| Formulation | Peak Heat Rel$^d$ kW/m$^2$ | Mass Loss Rate g/m$^2$s | CO Prod" Kg/Kg | CO$_2$ Prod" Kg/Kg | SEA (Smoke) m$^2$/Kg |
| --- | --- | --- | --- | --- | --- |
| Nylon 12 FR | 1800 | 18.6 | 0.01 | 1.2 | 100 |
| Nylon12 | 1344 | 17.1 | 0.03 | 1.6 | 385 |
| 7 | 670 | 13.9 | 0.01 | 1.6 | 220 |
| 8 | 695 | 14.1 | 0.01 | 1.6 | 240 |
| 9 | 782 | 16.1 | 0.01 | 1.7 | 280 |

TABLE 12

Vertical Burn Results

| Formulation | UL94 (3.2 mm) | FAA 12 s (1.6 mm) | FAA 12 s (0.75 mm) |
| --- | --- | --- | --- |
| Nylon 12 FR | V0 | Pass | Fail |
| Nylon12 | HB | Fail | Fail |
| 7 | V0 | Pass | Fail |
| 8 | V0 | Pass | Fail |
| 9 | V0 | Pass | Fail |

TABLE 13

Vertical Burn, Radiant Panel and Smoke Test Results (0.75 mm)

| Formulation | FAA 12 s (0.75 mm) | Smoke Ds | Radiant Panel |
| --- | --- | --- | --- |
| 9 | Fail | 4.88 | Full length burn |
| 8 | Fail | 11.86 | Full length burn |
| 7 | Fail | 21.45 | Full length burn |

TABLE 14

Toxic Gas Emission

| Toxic Gas (ppm) | Formulation 9 | Formulation 8 | Formulation 7 |
| --- | --- | --- | --- |
| HF | 3 | 3 | 5 |
| HCl | 1 | 1 | 3 |
| HCN | 4 | 4 | 4 |
| H$_2$S | — | — | — |
| NO$_x$ | 2 | 2 | 1 |
| HBr | 1 | 1 | 1 |
| PO$_4$ | — | — | — |
| SO$_2$ | 1 | 1 | 1 |

Example 9

Figure 4:
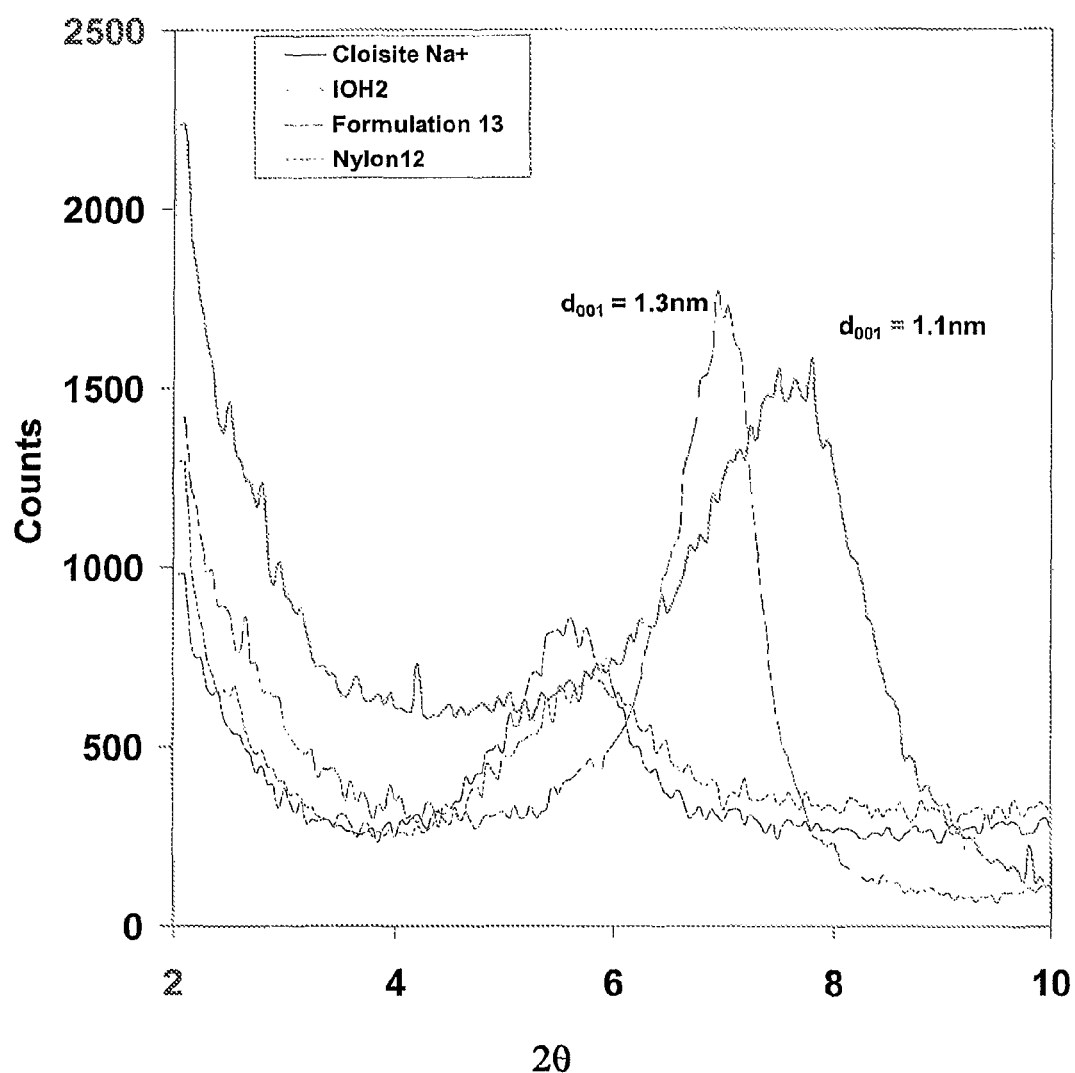
FIG. 4 is a graph showing the XRD results for Example 9.

Processing rheology (Table 15), XRD (FIG. 4), mechanical (Table 16) and fire performance (Table 17-19) of nylon12 modified with IOH2 incorporating montmorillonite modified with melamine hydrochloride/melamine and flame retarding additives (melamine cyanurate) during melt processing The following example indicates that the processing rheology of Nylon 12 is not effected by the melt dispersion of IOH2 and flame retardant at least partially on a nanometer scale (XRD). Such dispersion results in improved mechanical and vertical burn results compared with conventionally flame retarded nylon12. Samples of 0.75 mm provide good smoke and toxic gas release results, pass FAA type 12 s vertical burn tests and perform better in radiant panel tests. It is known to those in the art that flame retarding thin polymeric based materials is much more difficult than flame retarding thicker materials and as such meeting performance requirements at thin thickness is an indication of superior fire retarding performance.

TABLE 15

Processing Rheology

| Formulation | Extruder Torque (Nm) |
| --- | --- |
| Nylon 12 | 105 |
| 11 | 105 |
| 12 | 106 |
| 13 | 103 |

TABLE 16

Mechanical Performance

| Formulation | Tensile Modulus (MPa) | Tensile Strength (MPa) | Elongation at break (%) | Notched Impact Strength (J/m$^2$) |
| --- | --- | --- | --- | --- |
| Nylon12 | 1110 | 36 | 640 | 4600 |
| Nylon12 FR | 1712 | 48.1 | 77 | 2100 |
| 11 | 1443 | 39.7 | 140 | 3900 |
| 12 | 1398 | 39.0 | 215 | 4200 |
| 13 | 1349 | 38.9 | 375 | 4700 |

Standard Deviation - Modulus < 3%, Strength < 3 %, Elongation < 8%, Impact < 9%

TABLE 17

Fire Performance-Vertical Burn

| Formulation | UL94 (3.2 mm) | 12 s FAA (1.6 mm) | 12 s FAA (0.75 mm) | 60 s FAA (0.75 mm) |
|---|---|---|---|---|
| Nylon12 FR | V0 | Pass | Fail | Fail |
| Nylon12 | HB | Fail | Fail | Fail |
| 11 | V0 | Pass | Pass | Pass |
| 12 | V0 | Pass | Pass | Pass |
| 13 | V0 | Pass | Pass | Pass |

TABLE 18

Fire Performance (0.75 mm)

| Formulation | FAA 12 s Vertical Burn Extinguishment time Burn length Drip Extinguishment time | Smoke Ds | Radiant Panel Extinguishment time & Burn length |
|---|---|---|---|
| 11 | 4.9 s<br>46 mm<br>0 s | 6.79 | 5 sec<br>25 mm |
| 12 | 2 s<br>19 mm<br>0 s | 9.83 | 3 sec<br>25 mm |
| 13 | 0 s<br>21 mm<br>0 s | 3.31 | 1 sec<br>12.5 mm |

TABLE 19

Toxic Gas Emission

| Toxic Gas Emission (ppm) | Formulation 13 | 12 | 11 |
|---|---|---|---|
| HF | 6 | 4 | 3 |
| HCl | 1 | 1 | 1 |
| HCN | 8 | 7 | 7 |
| $H_2S$ | — | — | — |
| $NO_x$ | 3 | 2 | 2 |
| HBr | 1 | 1 | 1 |
| $PO_4$ | — | — | — |
| $SO_2$ | 1 | 1 | 1 |

Example 10

The following example illustrates the effect of different processing parameters on the mechanical performance (Table 20) and vertical burn performance (Table 21) of formulation 13 which incorporates IOH2+conventional flame retardant melamine cyanurate Results indicate the robustness of the formulation in terms of mechanical and fire performance to different processing conditions such as through-put, temperature profile, screw speed for the given screw and barrel configuration provided in FIG. 1.

TABLE 20

Mechanical Performance

| Conditions | | | | | | Notched |
|---|---|---|---|---|---|---|
| Processing Temp. (° C.) | Screw speed (rpm) | Through-put (Kg/h) | Tensile Modulus (MPa) | Tensile Strength (MPa) | | Impact Strength (J/m²) |
| 180 | 300 | 1.5 | 1300 | 37.6 | | 5100 |
| 190 | 300 | 1.5 | 1420 | 37.9 | | 5300 |
| 200 | 300 | 1.5 | 1420 | 38.4 | | 4800 |
| 210 | 300 | 1.5 | 1520 | 38.8 | | 4600 |
| 200 | 150 | 1.5 | 1500 | 37.7 | | 5300 |
| 200 | 400 | 1.5 | 1530 | 39.6 | | 4100 |
| 200 | 300 | 15 | 1540 | 39.4 | | 4100 |

Standard Deviation - Modulus < 3%, Strength < 3%, Impact < 9%

TABLE 21

FAA 12 s Vertical Burn Performance (0.75 mm thickness)

| Conditions | | | | Flame out |
|---|---|---|---|---|
| Processing Temp. (° C.) | Screw speed (rpm) | Through-put (Kg/h) | Result | Time (sec) |
| 180 | 300 | 1.5 | Pass | 5 |
| 190 | 300 | 1.5 | Pass | 4 |
| 200 | 300 | 1.5 | Pass | 2 |
| 210 | 300 | 1.5 | Pass | 6 |
| 200 | 150 | 1.5 | Pass | 2 |
| 200 | 400 | 1.5 | Pass | 7 |
| 200 | 300 | 15 | Pass | 3 |

Example 11

The following example illustrates the effect of different IOH2 (Example 2) and melamine cyanurate concentrations on mechanical and vertical burn performance of nylon12 (Table 22)

Results indicate that preferably more than 10% melamine cyanurate is required to pass FAA 12 s vertical burn test requirements at 0.75 mm thickness. Results also indicate that unlike classically flame retarded nylon12 this fire performance is achievable whilst maintaining excellent mechanical properties relative to nylon12.

TABLE 22

Performance of Formulations incorporating different concentrations of IOH2 and Melamine cyanurate

| Formulation | Tensile Modulus (MPa) | Tensile Strength (MPa) | Notched Impact Strength (J/m²) | FAA 12 s Vertical burn (0.75 mm) Ext. Time (s) |
|---|---|---|---|---|
| Nylon12 | 1100 | 36 | 4600 | Fail (62) |
| Nylon12 FR | 1712 | 48.1 | 2100 | Fail (24) |
| 11 | 1443 | 39.7 | 3900 | Pass (5) |
| 12 | 1398 | 39.0 | 4200 | Pass (5) |
| 13 | 1349 | 38.9 | 4700 | Pass (2) |
| 14 | 1480 | 37.9 | 4200 | Pass (14) |
| 15 | 1410 | 39.4 | 4400 | Pass (7) |
| 16 | 1386 | 40.1 | 4800 | Pass (6) |
| 17 | 1483 | 37.9 | 3900 | Fail (18) |
| 18 | 1476 | 39.4 | 5050 | Fail (19) |
| 19 | 1404 | 40.1 | 5200 | Fail (19) |
| 20 | 1445 | 37.8 | 4200 | Fail (32) |
| 21 | 1420 | 39.7 | 4500 | Fail (28) |
| 22 | 1361 | 40.1 | 5200 | Fail (32) |

Example 12

The following example illustrates the effect of different conventional flame retardants on the performance (Table 23) of nylon12 incorporating an IOH2 (Example 2).

The results presented in Table 23 demonstrate that materials incorporating the IOH and melamine cyanurate provide both excellent mechanical and fire performance. Formulations containing melamine phthalate and pentaerythritol phosphate also provide excellent fire performance with lower mechanical performance. Samples containing IOH with melamine cyanurate and Mg(OH)$_2$ provide the excellent mechanical performance in terms of impact, modulus, and strength also excellent vertical burn performance.

TABLE 23

Performance of formulations incorporation IOH2 and various conventional flame retardants

| Formulation | Tensile Modulus (MPa) | Tensile Strength (MPa) | Notched Impact Strength (J/m$^2$) | FAA 12 s vertical burn (0.75 mm) Ext. Time (sec) | UL 94 3.2 mm |
|---|---|---|---|---|---|
| 12 | 1460 | 39 | 4800 | Pass (2) | V0 |
| 23 | 1500 | 41 | 3900 | Fail (31) | V2 |
| 24 | 1540 | 41.9 | 2500 | Fail (26) | V2 |
| 25 | 1500 | 40.4 | 3000 | Fail (29) | V2 |
| 26 | — | — | — | Pass (7) | V0 |
| 27 | 1410 | 41.0 | 4100 | Fail (24) | V2 |
| 28 | 1420 | 43.5 | 1500 | Fail (32) | V2 |
| 29 | 1160 | 43.6 | 800 | Pass (10) | V0 |
| 30 | 1628 | 43.6 | 4800 | Pass (4) | V0 |

Example 13

The following example illustrates the effect of removing components of the fire resistant formulation on resultant fire performance (Table 24)

The results indicate that removal of either the modified inorganic-organic hybrid or melamine cyanurate from the formulation provides unsatisfactory vertical burn performance following FAA 12 s type testing at 0.75 mm thickness.

TABLE 24

FAA type Vertical Burn Performance (0.75 mm)

| Formulation | Ext. Time (s) | FAA requirement |
|---|---|---|
| Nylon12 | 65 ± 9 | Fail |
| 31 | 31 ± 4 | Fail |
| 32 | 32 ± 13 | Fail |
| 15 | 7 ± 4 | Pass |

Example 14

The following example illustrates the mechanical and 12 s vertical burn performance (Table 25) and cone calorimetry results (Table 26) of Nylon12 formulations prepared with IOH2 (Example 2), melamine cyanurate and magnesium hydroxide. Table 27 provides radiant panel, smoke, and 60 s FAA type vertical burn results for the above mentioned formulations. Mechanical and vertical burn performance of Nylon12 formulations incorporating IOH2, melamine cyanurate and magnesium hydroxide of different surface functionality and particle size distribution is provided in Table 28.

Results from Example 14 show that excellent processability, mechanical, vertical burn, and heat release results are obtainable with formulations incorporating IOH2, melamine cyanurate and low concentrations of magnesium hydroxide in particular formulations incorporating IOH dispersed at least partially on a nanometer scale, melamine cyanurate and 2.5% magnesium hydroxide which provides excellent mechanical, vertical burn and peak and average heat release results. The results also indicate that Mg(OH)$_2$ of different grades may be employed in conjunction with IOH2 and melamine cyanurate to produce formulations with excellent processability, mechanical and fire performance.

TABLE 25

Mechanical Performance of nylon materials with various amounts of IOH2 and conventional flame retardants

| Formulation | MFI (g/min) | Tensile Modulus (MPa) | Tensile Strength (MPa) | Notched Impact Strength (J/m$^2$) | FAA 12 s Vertical burn Ext. Time (s) (0.75 mm) |
|---|---|---|---|---|---|
| Nylon12 | 44 | 1100 | 36 | 4600 | Fail (62) |
| Nylon12 FR | 32 | 1712 | 48.1 | 2100 | Fail (24) |
| 33 | 12.6 | 1470 | 41.8 | 4500 | Fail (18) |
| 34 | 12.0 | 1460 | 41.1 | 4700 | Pass (10) |
| 35 | 11.5 | 1430 | 39.9 | 5200 | Pass (9) |
| 36 | 13.4 | 1578 | 43 | 3800 | Pass (6) |
| 30 | 13.5 | 1509 | 42 | 4800 | Pass (4) |
| 37 | 13.5 | 1543 | 40.5 | 5300 | Pass (6) |
| 38 | 13.4 | 1529 | 41 | 3900 | Fail (41) |
| 39 | 13 | 1520 | 40.6 | 4200 | Fail (19) |
| 40 | 13.1 | 1510 | 41.6 | 4600 | Pass (4) |

TABLE 26

Cone Calorimeter Heat Release Results

| Formulation | Peak Heat Release (kW/m$^2$) | 300 s Average Heat Release (kW/m$^2$) |
|---|---|---|
| Nylon12 | 1100 | 748 |
| Nylon12 FR | 1712 | 640 |
| 18 | 1314 | 707 |
| 21 | 1643 | 680 |
| 12 | 1595 | 676 |
| 39 | 1147 | 552 |
| 30 | 1001 | 578 |
| 34 | 885 | 491 |

TABLE 27

Comparison of fire performance of various formulations containing IOH2 dispersed at least partially on a nanometre scale, melamine cyanurate and optionally magnesium hydroxide H7

| Formulation | Radiant Panel Extinguishment time & Burn length (average) | Smoke Ds | Toxic Gas (FAA requirement) | FAA 60 Second Vertical burn (0.75 mm) (Extinguishment time seconds) |
|---|---|---|---|---|
| Nylon12 | — | 21 | Pass | — |
| 22 | — | 11.7 | Pass | — |
| 21 | — | 10.4 | Pass | — |
| 20 | — | 7.8 | Pass | — |
| 19 | — | 11.3 | Pass | — |
| 18 | — | 11.4 | Pass | Fail (20) |
| 17 | — | 8.1 | Pass | Pass (9) |
| 13 | 1 second 12.4 mm | 14.5 | Pass | Pass (0) |
| 12 | — | 14.4 | Pass | Pass (0) |

TABLE 27-continued

Comparison of fire performance of various formulations containing IOH2 dispersed at least partially on a nanometre scale, melamine cyanurate and optionally magnesium hydroxide H7

| Formulation | Radiant Panel Extinguishment time & Burn length (average) | Smoke Ds | Toxic Gas (FAA requirement) | FAA 60 Second Vertical burn (0.75 mm) (Extinguishment time seconds) |
|---|---|---|---|---|
| 11 | — | 7.5 | Pass | Fail (133) |
| 39 | — | 15 | Pass | Fail (58) |
| 30 | — | 14.5 | Pass | Pass (15) |
| 34 | 2.5 second 15.0 mm | 11.3 | Pass | Pass (7) |

TABLE 28

Performance of materials, incorporating IOH2 melamine cyanurate and Mg(OH)$_2$ with various particle size and surface functionality

| Formulation | MFI (g/min) | Tensile Modulus (MPa) | Tensile Strength (MPa) | Notched Impact Strength (J/m$^2$) | FAA 12 s Vertical burn Ext. Time (s) (0.75 mm) |
|---|---|---|---|---|---|
| 34 | 13.5 | 1480 | 40.4 | 5100 | Pass (6) |
| 41 | 11.5 | 1420 | 41 | 5000 | Pass (6) |
| 42 | 16.2 | 1470 | 40.2 | 5300 | Pass (13) |
| 44 | 12.4 | 1470 | 40.4 | 5300 | Pass (14) |

Example 15

The following example illustrates the mechanical and vertical burn performance (Table 29) of Nylon12 formulations prepared with the inorganic-organic hybrids outlined in Examples 1, 2 & 4 and melamine cyanurate The results indicate superior fire performance of nylon12 formulations containing the intercalated and modified IOH (Examples 2 and 4) compared with that prepared with just melamine hydrochloride modified IOH (Example 1).

TABLE 29

Mechanical and Vertical Burn Performance

| Formulation | Tensile Strength (MPa) | Tensile Modulus (MPa) | Notched Impact Strength J/m$^2$ | 0.75 mm FAA 12 sec Vertical Burn (Ext. time sec) |
|---|---|---|---|---|
| 44 | 41.7 | 1490 | 5000 | Fail (22) |
| 45 | 39.5 | 1531 | 4100 | Pass (12) |
| 46 | 40.1 | 1580 | 4600 | Pass (2) |
| 47 | 39.2 | 1550 | 4100 | Pass (5) |
| 18 | 40.4 | 1590 | 4700 | Fail (19) |
| 12 | 39.3 | 1628 | 4000 | Pass (3) |

Standard Deviation - Modulus < 5%, Strength < 5%, Impact < 10%

Example 16

The following example illustrates the performance of nylon6 and nylon66 formulations incorporating IOH2 and melamine cyanurate The results indicate that IOH2 at least partially dispersed on a nanometer scale in conjunction with melamine cyanurate provides excellent mechanical and vertical burn performance relative to nylon6 and nylon66.

TABLE 30

Mechanical and Vertical Burn Performance

| Formulation | Tensile Modulus (MPa) | Tensile Strength (MPa) | Notched Impact Strength (J/m$^2$) | FAA 12 s Vertical burn Ext. Time (s) (0.75 mm) |
|---|---|---|---|---|
| Nylon6 | 2720 | 76 | 1900 | Fail (61) |
| 48 | 2970 | 73.5 | 2000 | Pass (1) |
| Nylon66 | 2890 | 83.5 | 1900 | Fail (65) |
| 49 | 3500 | 67 | 1900 | Pass (1) |

Example 17

Figure 5:
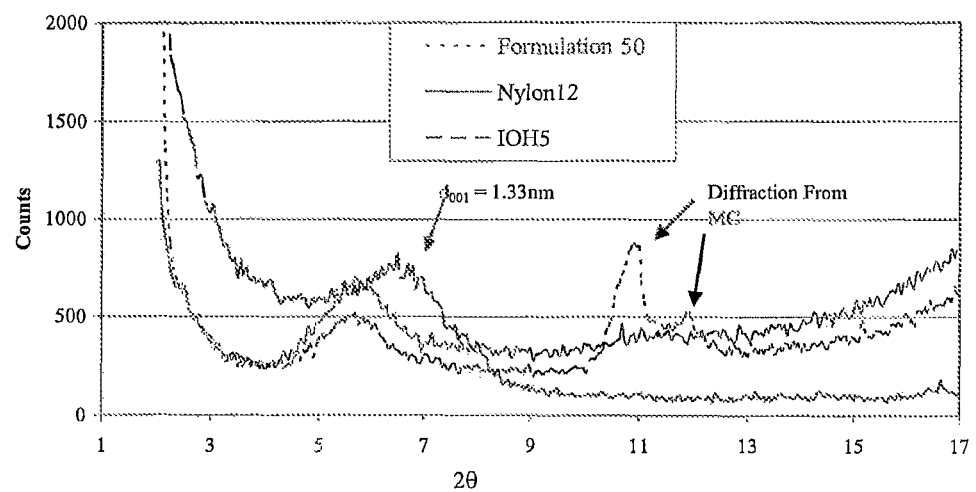
FIG. 5 is a graph showing XRD results for Example 17.

The following example shows the XRD of nylon 12 formulations incorporating modified and intercalated hectorite (Example 6) dispersed at least partially on a nanometer scale (FIG. 5) and melamine cyanurate and the formulations vertical burn performance (Table 31)

The XRD results indicate that hectorite is modified owing to its larger intergallery spacing compared with the starting material, Nylon12 incorporating IOH5 at least partially dispersed on a nanometer scale (FIG. 5) and melamine cyanurate show excellent fire performance.

TABLE 31

Vertical Burn Performance

| Formulation | FAA 12 s Vertical burn, Ext. Time (s)(0.75 mm) |
|---|---|
| Nylon12 | Fail (68) |
| 50 | Pass (2) |

Example 18

This example shows the rheology (Table 32) and mechanical and vertical burn performance (Table 33) of formulations incorporating IOH2, conventional flame retardant and minor processing additives.

This example illustrates that reductions in viscosity across a range of shear rates of the formulations incorporating nylon12, IOH2 and conventional flame retardants through the addition of (additional) minor processing additives during processing. This reduction in viscosity is possible without a significant reduction in mechanical performance and generally without compromising fire performance particularly under the stringent conditions required to fire retard thin materials to meet performance standards outlined by various regulatory bodies.

TABLE 32

Rheology of formulations at different shear rates and corresponding MFI data

| Formulation | Shear rate | | | | MFI g/min |
|---|---|---|---|---|---|
| | $10^{-2}$ | $10^{-1}$ | $10^{0}$ | $10^{1}$ | |
| | Viscosity (Pas) | | | | |
| Nylon12 | 223 | 169 | 106 | 108 | 35 |
| 13 | 13100 | 1750 | 300 | 124 | 29 |
| 34 | 719 | 624 | 560 | 502 | 13 |
| 51 | 4800 | 1040 | 226 | 128 | 34 |
| 52 | 1920 | 6590 | 1560 | 95 | 39 |
| 53 | 1100 | 865 | 168 | 95 | 39 |

TABLE 32-continued

Rheology of formulations at different shear rates and corresponding MFI data

| Formulation | Shear rate | | | | MFI g/min |
|---|---|---|---|---|---|
| | $10^{-2}$ | $10^{-1}$ | $10^{0}$ | $10^{1}$ | |
| | Viscosity (Pas) | | | | |
| 54 | 554 | 865 | 162 | 95 | 41 |
| 55 | 98300 | 1930 | 335 | 143 | 33 |
| 56 | 13500 | 1870 | 284 | 106 | 31 |

TABLE 33

Mechanical and Vertical Burn Performance

| Formulation | Tensile Modulus (MPa) | Tensile Strength (MPa) | Notched Impact Strength (J/m$^2$) | 0.75 mm FAA 12 sec Vertical Burn (Extinguishment time (s)) |
|---|---|---|---|---|
| Nylon12 | 1100 | 36 | 4600 | Fail (62) |
| 13 | 1349 | 38.9 | 4700 | Pass (2) |
| 34 | 1480 | 40.4 | 5100 | Pass (6) |
| 51 | 1215 | 35.8 | 3500 | Pass (3) |
| 52 | 1165 | 35.5 | 3500 | Pass (2) |
| 53 | 1233 | 36.4 | 3500 | Pass (13) |
| 54 | 1176 | 35.3 | 3300 | Fail (25) |
| 55 | 1168 | 33.3 | 3300 | Pass (8) |
| 56 | 1241 | 35 | 3700 | Pass (10) |

Example 19

This example provides the mechanical and fire performance (Table 34) of nylon12 formulations incorporating IOH2, conventional flame retardants and minor component of stabilizer.

The results indicate that the mechanical and vertical burn performance of formulations containing nylon12, IOH2 conventional flame retardant is not significantly reduced by addition of additional stabilizer to the formulation during compounding.

TABLE 34

Mechanical and Vertical Burn Performance

| Formulation | Tensile Modulus (MPa) | Tensile Strength (MPa) | Notched Impact Strength J/m$^2$ | 0.75 mm FAA 12 sec Vertical Burn (Extinguishment time (s)) |
|---|---|---|---|---|
| Nylon12 | 1100 | 36 | 4600 | Fail (62) |
| 13 | 1349 | 38.9 | 4700 | Pass (2) |
| 57 | 1394 | 39.1 | 4800 | Pass (4) |

Example 20

This example shows that formulations incorporating IOH's may not only be fabricated into materials, components and parts of components by processes such as extrusion, injection moulding, compression moulding and alike but also by low shear processes such as rotational moulding (FIG. 6) and selective laser sintering.

Figure 6:
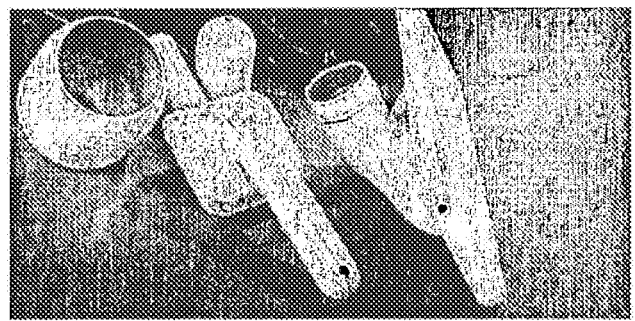
FIG. 6 is a picture of complex hollow fire resistant components moulded with formulations 13 and 34.

FIG. 6 provides examples of components manufactured by rotational moulding employing formulations incorporating IOH2, melamine cyanurate optionally magnesium hydroxide and other additives such as but not limited to formulation 13 and 34. The examples illustrate that such formulations show suitable thermal/oxidative stability and melt rheology for manufacturing components under low shear and thermally demanding environments.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A formulation which comprises either:
   (A) (a) an inorganic-organic hybrid (IOH) which comprises:
      (i) an expandable or swellable layered inorganic component, which is a naturally occurring or synthetic analogue of a phyllosilicate having a platelet thickness less than 5 nanometers and an aspect ratio greater than 10:1; and
      (ii) an organic component including at least one ionic organic component and one or more neutral organic components which are intercalated between the layer(s) of the inorganic component to provide an intergallery spacing expanded to greater than 1.27 nm and not more than 1.84 nm, in which the neutral organic component is a neutral derivative of a triazine based species,
      the ionic or neutral organic components decomposing or subliming endothermically, and/or releasing volatiles with low combustibility on decomposition and/or inducing charring of organic species during thermal decomposition or combustion; and
   (b) a polyamide based matrix; or
   (B) (a) a fire resistant formulation which comprises the IOH defined as component (a) under (A) above; and one or more flame retardants; and
   (b) a polyamide based matrix,
      wherein the IOH for both (A) and (B) is in the form of solid particles.

2. A formulation according to claim 1, in which the polyamide based matrix comprises generic groups with repeat units based on amides selected from Nylon4, Nylon6, Nylon7, Nylon 11, Nylon12, Nylon46, Nylon66, Nylon 68, Nylon610, Nylon612 and aromatic polyamides and co-polymers, blends or alloys thereof.

3. A formulation according to claim 1, in which the polyamide based matrix is selected from Nylon12, Nylon6 and Nylon66 and co-polymers, alloys or blends thereof.

4. A formulation according to claim 1, which further comprises one or more additives.

5. A formulation according to claim 2, in which the additives are selected from polymeric stabilisers; lubricants; antioxidants; pigments, dyes or other additives to alter the materials optical properties or colour; conductive fillers or fibers; release agents; slip agents; plasticisers; antibacterial or fungal agents; and processing agents.

6. A formulation according to claim 5, in which the polymeric stabiliser is a UV, light or thermal stabilizer.

7. A formulation according to claim 5, in which the processing agents are selected from dispersing reagents, foaming or blowing agents, surfactants, waxes, coupling reagents, rheology modifiers, film forming reagents and free radical generating reagents.

8. A formulation according to claim 1, in which the polyamide based matrix is Nylon12, Nylon6 and/or Nylon66; the IOH is montmorillonite or hectorite modified with melamine hydrochloride and/or melamine cyanurate hydrochloride and/or melamine and/or melamine cyanurate; and the flame retardant is melamine cyanurate and/or magnesium hydroxide; and the additive is a processing agent and/or a polymeric stabiliser.

9. A formulation according to claim 4, in which the polyamide based matrix is present in an amount of about 45 to about 95% w/w, the IOH is present in an amount less than about 25% w/w and the flame retardant and/or additives are present in an amount less than about 30% w/w.

10. A formulation according to claim 4, in which the polyamide based matrix is present in an amount greater than about 75% w/w, the IOH is present in an amount less than about 3% w/w, the melamine cyanurate flame retardant is present in an amount of about 11 to about 15% w/w and additives are present in an amount less than about 4% w/w.

11. A formulation according to claim 4, in which the polyamide based matrix is present in an amount greater than about 75% w/w, the IOH is present in an amount less than about 3% w/w, the melamine cyanurate flame retardant is present in an amount of about 11 and about 15% w/w, magnesium hydroxide flame retardant present in an amount of about 1 and about 5% w/w and additives are present in an amount less than about 4% w/w.

12. A formulation according to claim 1, in which the inorganic component is rendered positively or negatively charged due to isomorphic substitution of elements within the layers.

13. A formulation according to claim 1, in which the naturally occurring or synthetic analogue of a phyllosilicate is a smectite clay.

14. A formulation which comprises either:
   (A) (a) an inorganic-organic hybrid (IOH) which comprises:
      (i) an expandable or swellable layered inorganic component, which is a naturally occurring or synthetic analogue of a phyllosilicate having a platelet thickness less than 5 nanometers and an aspect ratio greater than 10:1; and
      (ii) an organic component including at least one ionic organic component and one or more neutral organic components which are intercalated between the layer(s) of the inorganic component, in which the neutral organic component is a neutral derivative of a triazine based species,
   the ionic or neutral organic components decomposing or subliming endothermically, and/or releasing volatiles with low combustibility on decomposition and/or inducing charring of organic species during thermal decomposition or combustion; and
   (b) a polyamide based matrix; or
   (B) (a) a fire resistant formulation which comprises the IOH defined as component (a) under (A) above; and one or more flame retardants; and
   (b) a polyamide based matrix,
   wherein the IOH for both (A) and (B) is in the form of solid particles, and wherein the IOH is selected from the group consisting of melamine and melamine hydrocholoride modified montmorillonite, melamine and melamine cyanurate hydrochloride modified montmorillonite, melamine and trimethyl cetylammonium chloride modified montmorillonite, and melamine and melamine hydrochloride modified synthetic hectorite.

15. A formulation according to claim 13, in which the smectite clay is selected from montmorillonite, nontronite, beidellite, volkonskoite, hectorite, bentonite, saponite, sauconite, magadiite, kenyaite, laponite, vermiculite, synthetic micromica and synthetic hectorite.

16. A formulation according to claim 1, in which the naturally occurring phyllosilicate is selected from bentonite, montmorillonite and hectorite.

17. A formulation according to claim 1, in which the aspect ratio is greater than about 50:1.

18. A formulation according to claim 1, in which the aspect ratio is greater than about 100:1.

19. A formulation according to claim 1, in which the layers of the inorganic component have an intergallery distance greater than 1.3 nanometers.

20. A formulation according to claim 1, in which the inorganic component includes interlayer or exchangeable metal cations.

21. A formulation according to claim 20, in which the metal cation is selected from an alkali metal and alkali earth metal.

22. A formulation according to claim 21, in which the alkali or alkali earth metal is selected from $Na^+$, $K^+$, $Mg^{2+}$ and $Ca^{2+}$.

23. A formulation according to claim 20, in which the cation exchange capacity of the inorganic component is less than about 400 milli-equivalents per 100 grams.

24. A formulation according to claim 1, in which the ionic organic component was exchanged with exchangeable metal ions of the inorganic component.

25. A formulation according to claim 1, in which the ionic organic component contains onium ion(s).

26. A formulation according to claim 25, in which the ionic organic component containing onium ion(s) is an ammonium, phosphonium or sulfonium derivative of an aliphatic, aromatic or aryl-aliphatic amine, phosphine or sulfide.

27. A formulation according to claim 1, in which the ionic organic component is an ionic derivative of a nitrogen based molecule.

28. A formulation according to claim 27, in which the nitrogen based molecule is a triazine based species.

29. A formulation according to claim 1, in which the triazine based species is selected from melamine, triphenyl melamine, melam (1,3,5-triazine-2,4,6-triaminen-(4,6-di-amino-1,3,5-triazine-yl)), melem ((-2,5,8-triamino-1,3,4,6, 7,9,9b-heptaazaphenalene)), melon (poly{8-amino-1,3,4, 6, 7, 9, 9b-heptaazaphenalene-2,5-diyl)imino}), bis and triaz-iridinyltriazine, trimethylsilyltriazine, melamine cyanurate, melamine phthalate, melamine phosphate, melamine phosphite, melamine phthalimide, dimelamine phosphate, phosphazines, low molecular weight polymers with triazine and phosphazine repeat units and isocyanuric acid and salts or derivatives thereof.

30. A formulation according to claim 29, in which isocyanuric acid and salts or derivatives thereof are selected from isocyanuric acid, cyanuric acid, triethyl cyanurate; melamine cyanurate, trigylcidylcyanurate, triallyl isocyanurate, trichloroisocyanuric acid, 1,3,5-tris (2-hydroxyethyl) triazine-2,4,6-trione, hexamethylenentetramine.melam cyanurate, melem cyanurate and melon cyanurate.

31. A formulation according to claim 27, in which the organic component is a derivative of phosphoric acid or boric acid.

32. A formulation according to claim 31, in which the derivative of phosphoric acid or boric acid is selected from ammonia polyphosphate, melamine polyphosphate and melamine phosphate ammonium borate.

33. A formulation according to claim 1, in which the ionic organic component is used in combination with other ionic compounds which are capable of improving compatibility and dispersion between the inorganic and organic components.

34. A formulation according to claim 33, in which the other ionic compound is an amphiphilic molecule that incorporates a hydrophilic ionic group along with hydrophobic alkyl or aromatic moieties.

35. A formulation according to claim 1, in which the IOH further comprises one or more coupling reagents.

36. A formulation according to claim 35, in which the coupling reagent is selected from an organically functionalised silane, zirconate and titanate.

37. A formulation according to claim 36, in which the silane coupling reagent is tri-alkoxy, acetoxy or halosilanes functionalised with amino, epoxy, isocyanate, hydroxyl, thiol, mercapto and/or methacryl reactive moieties or modified to incorporate functional groups based on triazine derivatives, long chain alkyl, aromatic or alkylaromatic moieties.

38. A formulation according to claim 1, in which the flame retardant is selected from phosphorus derivatives, nitrogen containing derivatives, molecules containing borate functional groups, molecules containing two or more alcohol groups, molecules which endothermically release non-combustible decomposition gases and expandable graphite.

39. A formulation according to claim 38, in which the phosphorus derivatives are selected from melamine phosphate, dimelamine phosphate, melamine polyphosphate, ammonia phosphate, ammonia polyphosphate, pentaerythritol phosphate, melamine phosphite and triphenyl phosphine.

40. A formulation according to claim 38, in which the nitrogen containing derivatives are selected from melamine, melamine cyanurate, melamine phthalate, melamine phthalimide, melam, melem, melon, melam cyanurate, melem cyanurate, melon cyanurate, hexamethylene tetraamine, imidazole, adenine, guanine, cytosine and thymine.

41. A formulation according to claim 38, in which the molecules containing borate functional groups are selected from ammonia borate and zinc borate.

42. A formulation according to claim 38, in which the molecules containing two or more alcohol groups are selected from pentaerythritol, polyethylene alcohol, polyglycols and carbohydrates.

43. A formulation according to claim 38, in which the molecules which endothermically release noncombustible decomposition gases are selected from magnesium hydroxide and aluminum hydroxide.

44. A method for the preparation of the formulation of claim 1 which comprises mixing the IOH and the polyamide based matrix or constituents thereof in one or more steps.

45. A method according to claim 44, in which mixing is achieved using melt, solution or powder processing.

46. A method according to claim 44, in which the mixing is achieved using melt processing in a twin screw extruder or batch mixer; or powder processing using a high shear powder mixer or milling procedures.

47. A method for the preparation of the formulation of claim 1 which comprises dispersing the IOH or constituents thereof into the polyamide based matrix in one or more steps.

48. A method according to claim 47, in which at least some of the components are ground prior to mixing.

49. A method according to claim 48, in which the components are ground to a particle size less than 200 microns.

50. A method according to claim 47, in which dispersion is achieved using melt, solution or powder processing.

51. A method according to claim 47, in which dispersion is achieved using melt processing in a single or twin screw extruder, batch mixer or continuous compounder.

52. A method according to claim 51, in which the melt processing is conducted in a twin screw extruder.

53. A method according to claim 47, in which the dispersion occurs at a sufficient shear rate, shear stress and resistance time to disperse the IOH at least partially on a nanometer scale.

54. A fire resistant article or parts thereof which is composed wholly or partly of the fire resistant formulation of claim 1 made from the formulation of claim 1.

55. A fire resistant article or parts thereof as defined in claim 54, which is a hollow article or sheet.

56. A fire resistant article or parts thereof as defined in claim 54, which is selected from pipes, ducts, fabric, carpet, wires, fibers, Environmental control systems, stowage bin hinge covers, cable trays, ECS duct spuds, latches, brackets, passenger surface units and thermoplastic laminate sheet.

57. A fire resistant fiber, fabric, carpet or parts thereof which is composed wholly or partly of the fire resistant formulation made from the formulation of claim 1.

58. A method of preparing the fire resistant article or parts thereof defined in claim 55, which comprises molding or forming the fire resistant formulation or constituents thereof made from the formulation of claim 1.

59. A method according to claim 58, in which the molding or forming is carried out using extrusion, injection molding, compression molding, rotational molding, blow molding, sintering, thermoforming, calending or combinations thereof.

60. A method of producing a polyamide fire resistant formulation, the process comprising extruding the formulation of claim 1.

61. A fire resistant formulation comprising:
an inorganic-organic hybrid which comprises:
an expandable or swellable layered inorganic component, which is a naturally occurring or synthetic analogue of a phyllosilicate having a platelet thickness less than 5 nanometers and an aspect ratio greater than 10:1; and
an organic component including at least one ionic organic component and one or more neutral organic components which are intercalated between the layer(s) of the inorganic component, the ionic or neutral organic components decomposing or subliming endothermically, and/or releasing volatiles with low combustibility on decomposition and/or inducing charring of organic species during thermal decomposition or combustion;
wherein the neutral organic component is melamine and the ionic organic component is selected from at least one of melamine hydrochloride, melamine cyanurate hydrochloride and trimethylcetylammonium chloride.

* * * * *